United States Patent
Davis et al.

(10) Patent No.: US 10,239,609 B2
(45) Date of Patent: Mar. 26, 2019

(54) PITCH LINK WITH TRACK ADJUSTMENT INDICATORS

(71) Applicant: Bell Helicopter Textron Inc., Fort Worth, TX (US)

(72) Inventors: Hunter Jay Davis, Winters, TX (US); Mark Adam Wiinikka, Hurst, TX (US)

(73) Assignee: BELL HELICOPTER TEXTRON INC., Fort Worth, TX (US)

(*) Notice: Subject to any disclaimer, the term of this patent is extended or adjusted under 35 U.S.C. 154(b) by 84 days.

(21) Appl. No.: 15/656,929

(22) Filed: Jul. 21, 2017

(65) Prior Publication Data

US 2019/0023387 A1    Jan. 24, 2019

(51) Int. Cl.
*B64C 27/54* (2006.01)
*B64C 27/605* (2006.01)
*F16C 7/06* (2006.01)

(52) U.S. Cl.
CPC .......... *B64C 27/605* (2013.01); *F16C 7/06* (2013.01)

(58) Field of Classification Search
CPC ....... B64C 27/605; B64C 27/54; B64C 27/58; B64C 27/59; B64C 27/80; F16C 7/06; F16C 2326/43; F16B 7/10
See application file for complete search history.

(56) References Cited

U.S. PATENT DOCUMENTS

| | | | |
|---|---|---|---|
| 2,759,359 A * | 8/1956 | Jensen | B64C 27/008 416/168 R |
| 3,415,324 A | 12/1968 | Austin | |
| 3,736,010 A | 5/1973 | Larkin | |
| 4,498,842 A * | 2/1985 | Fischer | B64C 27/54 416/155 |
| 5,026,254 A * | 6/1991 | Ford | B64C 27/008 116/281 |
| 5,946,981 A * | 9/1999 | Ide | B64C 27/72 74/579 R |
| 6,077,040 A * | 6/2000 | Pruden | B24C 11/00 416/153 |
| 6,102,659 A * | 8/2000 | Rampal | B64C 27/605 416/114 |
| 6,453,669 B2 * | 9/2002 | Kennedy | B64C 27/001 60/527 |

(Continued)

FOREIGN PATENT DOCUMENTS

GB    2028952 A    3/1980

*Primary Examiner* — Grant Moubry
(74) *Attorney, Agent, or Firm* — Slater Matsil, LLP

(57) ABSTRACT

A system and method for measuring, or otherwise determining pitch length adjustments to a pitch link coupled to a rotor blade in a rotorcraft includes vertical track adjustment indicators machined onto an exterior of the tube of the pitch link and a vertical reference indicator machined onto an exterior of the upper or the lower rod of the pitch link. A metric of a pitch length adjustment can be determined by tracking or counting how many track adjustment indicators pass the reference indicator while the tube of the pitch link is being turned in either direction for increasing or decreasing the pitch length. The track adjustment indicators can be relied upon to track one or a series of adjustments for tracking a rotor blade installed in a rotor assembly.

20 Claims, 10 Drawing Sheets

(56) References Cited

U.S. PATENT DOCUMENTS

| | | | |
|---|---|---|---|
| 7,524,169 B2* | 4/2009 | Podgurski | B64C 27/605 |
| | | | 416/168 R |
| 8,622,671 B2* | 1/2014 | Gagneur | F16B 39/108 |
| | | | 403/315 |
| 9,731,819 B2* | 8/2017 | Wiinikka | B64C 27/51 |
| 2014/0271180 A1* | 9/2014 | Haldeman | F01D 7/00 |
| | | | 416/1 |

* cited by examiner

PITCH LINK WITH TRACK ADJUSTMENT INDICATORS

TECHNICAL FIELD

The present invention generally relates to a system and method for configuring and using an adjustable pitch link in a rotorcraft rotor assembly for rotor blade track adjustment.

BACKGROUND

Generally, rotorcrafts with multi-blade rotor hub configurations often include a main rotor assembly for supplying forces for flight, and a tail rotor assembly (sometimes referred to as an anti-torque system) that stabilizes and influences the flight direction of the rotorcraft.

Rotor blades in the main rotor assembly rotate at a given speed. In flight, they also change their pitch angle to alter direction of flight, speed, and lift of the rotorcraft. If all rotor blades of a rotor assembly were susceptible to uniform manufacture and installation to specification, then the tips of the rotor blades should all "track" through a same point in space at a given point in the rotation cycle around the hub of the main rotor assembly-thereby providing a rotation track for the rotor blades while the rotorcraft is in operation.

However, no two rotor blades are identical or installed to precise specification. When the rotor assembly of the rotorcraft is spooled up, the rotor blades may appear to run out of balance with each other. In such a case, the rotor blades are generally not within rotation track tolerance (i.e., close enough to the rotation track). Operating unbalanced rotor blades may cause a vibration or beat frequency to be transmitted into the main rotor hub, the transmission, or airframe of the rotorcraft; thereby introducing vibration into other parts of the rotorcraft. Excessive vibration levels can lead to premature wear and failure in various components of the rotorcraft. As a result, there is an increase in maintenance costs and rotorcraft downtime.

In order to correct balancing of any one or more of the rotor blades, the rotor blades are tracked after installation. During tracking, adjustments are made to various components in the main rotor system of the rotorcraft. Tracking continues for multiple operational runs of the rotor blades, and through multiple adjustments, until the rotor blades are sufficiently balanced with each other and stay reasonably close to the rotation track. Therefore, certain mechanisms or indicators may be advantageous to enable installers and maintainers to track each round of adjustment in order to complete the tracking and installation process in a time efficient and effective manner, and to ensure safe operation of the rotorcraft.

SUMMARY

In a representative embodiment, a method for balancing rotor blades in a rotor assembly of a rotorcraft is provided. A first rotor blade is installed in the rotor assembly of the rotorcraft. The first rotor blade is one of a plurality of rotor blades installed in the rotor assembly. A first operation of the rotor assembly is started with a first spooling up of the rotor assembly while the rotorcraft remains grounded. A first deviation is measured of the tip path of first rotor blade from a rotation track. The first operation of the rotor assembly is stopped. Based on the first deviation, a first adjustment is made to a pitch length of a first pitch link that is coupled to the first rotor blade.

The first pitch link has an upper end, a lower end opposite the upper end, and a vertical axis defined from the upper end to the lower end. The first pitch link includes a tube between the upper end and the lower end, an upper rod at the upper end threaded into an upper portion of the tube, and a lower rod at the lower end threaded into a lower portion of the tube. The upper rod couples the first pitch link to the first rotor blade. The lower rod couples the first pitch link to a swash plate of the rotor assembly.

In order to make the first adjustment to the pitch length, an upper jam nut on the upper end of the pitch link is loosened and a lower jam nut of the lower end of the pitch link is loosened. Then, the tube is turned around the vertical axis while the first pitch link remains coupled in position to the first rotor blade and the swash plate. The tube turning a first direction increases the pitch length. The tube turning in a second direction, opposite the first direction, decreases the pitch length.

The amount of the first adjustment to the pitch length is determined by counting a first number of vertical track adjustment indicators on the tube that at least partly pass a vertical reference indicator on the upper rod while the tube is turned in one of the first direction or the second direction. A plurality of vertical track adjustment indicators, including the first number of vertical track adjustment indicators, are machined onto an outer surface of the upper portion of the tube. The vertical reference indicator is machined onto a substantially vertical and substantially planar surface of the upper rod.

Alternatively, the vertical reference indicator can be machined instead onto a substantially vertical and substantially planar surface of the lower rod, and the plurality of track adjustment indicators can be machined onto an outer surface of the lower portion of the tube. Then, the amount of the first adjustment to the pitch length is determined by counting the first number of vertical track adjustment indicators on the lower portion of the tube that at least party pass the vertical reference indicator on the lower rod while the tube is turned in one of the first direction or the second direction.

The upper jam nut and the lower jam nut are tightened. A second operation of the rotor assembly is started after making the first adjustment. Based on the second operation, determining whether the first adjustment to the pitch length reduced a second deviation of the first rotor blade from the rotation track.

In other embodiments, one general aspect of a rotorcraft includes a mast, a yoke, a plurality of rotor blades, a rotating ring, a swash plate, and a plurality of pitch links. The mast is configured to rotate around a principal axis that extends along a length of the mast. The yoke is coupled to the mast. A rotation of the mast rotates the yoke around the principal axis while the rotorcraft is in operation. The rotor blades are coupled to the yoke around a circumference of the yoke. A rotation of the yoke rotates the plurality of rotor blades around the principal axis. A tip of each of the plurality of rotor blades traces a tip path while the rotor blade is rotating around the principal axis. The rotating ring is coupled to the mast or the yoke. A rotation of the mast rotates the rotating ring around the principal axis, either directly, or via a rotation of the yoke. Each pitch link in the plurality of pitch links has an upper end and a lower end opposite the upper end. The upper end of the pitch link is coupled to one to one of the plurality of rotor blades. The lower end is coupled to the rotating ring along a circumference of the rotating ring. Rotation of the rotating ring rotates the plurality of pitch links around the principal axis. The non-rotating ring is disposed under the rotating ring. The non-rotating ring changes a position or angle of the rotating ring relative to the principal axis while the rotating ring and the pitch links are in rotation around the principal axis. A change in the positioning of either or both sides of the rotating ring is configured to displace each of the plurality of pitch links relative to the principal axis and change pitch of the rotor blades, while the pitch links are engaged in maintaining the tip paths of the plurality of rotor blades within a tolerable distance from a rotation track. The pitch length of each pitch link is adjustable. Each pitch link has a tube marked with a plurality of track adjustment indicators, and an upper rod or lower rod threaded into the tube that is marked with a reference indicator. The track adjustment indicators and the reference indicator are vertical. The amount of adjustment to the pitch length is configured to be determined in accordance with a number of track adjustment indicators in the plurality of track adjustment indicators that at least partly pass the reference indicator while the tube is turned in one of the first direction or the second direction.

BRIEF DESCRIPTION OF THE DRAWINGS

Aspects of the present disclosure may be understood from the following detailed description when read in conjunction with the accompanying Figures. It is noted that, in accordance with standard practice in industry, various features may not be drawn to scale. For example, dimensions of various features may be arbitrarily increased or reduced for clarity of illustration or description. Corresponding numerals and symbols in different Figures generally refer to corresponding parts, unless otherwise indicated.

DETAILED DESCRIPTION OF ILLUSTRATIVE EMBODIMENTS

Figure 1:
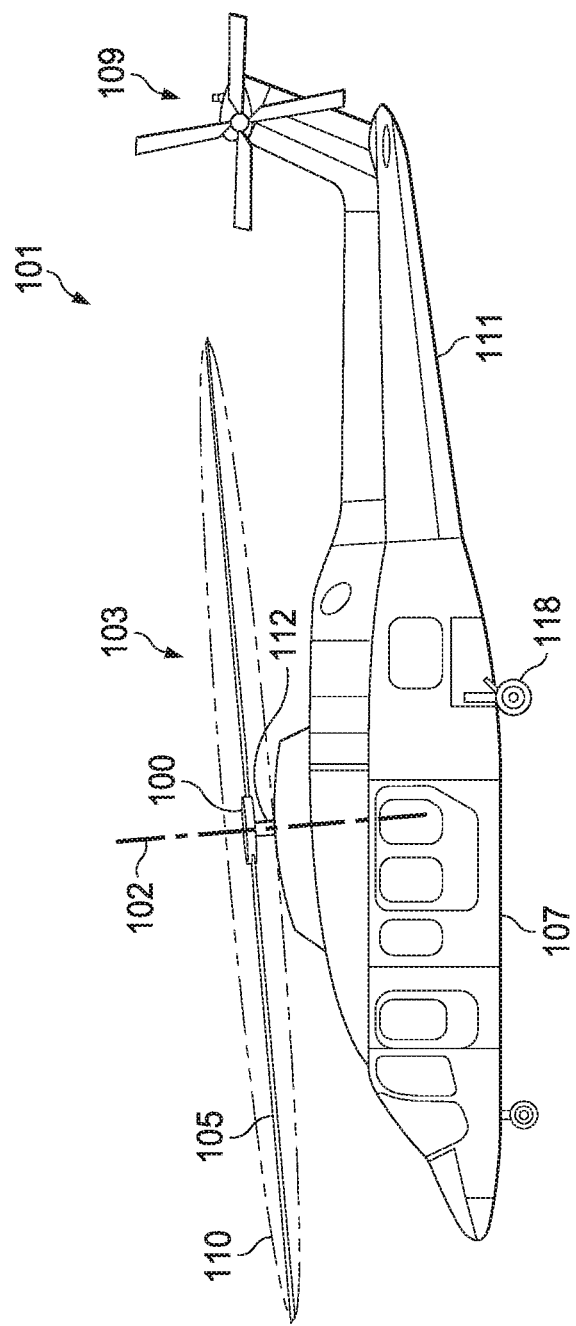
FIG. 1 representatively illustrates a rotorcraft, according to some embodiments.

The following disclosure provides representative embodiments, or examples, for implementing different features of the subject matter disclosed herein. Specific examples of components and arrangements are described below to simplify the present disclosure. These are, of course, merely examples and are not intended to be limiting. In addition, the present disclosure may repeat reference numerals or letters in various examples. This repetition is for simplicity and clarity of discussion, and does not in itself dictate a relationship between various embodiments or configurations. Therefore, various changes, substitutions, or alterations can be made herein without departing from the spirit and scope of the appended claims.

Pitch links are used to maintain or change a pitch of rotor blades during operation of a rotorcraft. Representative means of configuring pitch links and adjusting the pitch length while tracking rotor blades installed in a rotorcraft are described herein, including a representative pitch link for a rotor blade in a main rotor assembly of a rotorcraft. Although a pitch link is described in connection with the main rotor assembly, it will be understood by those of skill in the art that embodiments described herein are applicable to rotor blades in the tail rotor assembly and a wide variety of other applicable contexts.

As described above, no two rotor blades are identical in weight, size, or shape, or installed exactly to specification, and often will not run sufficiently close to rotation track after installation. Once installed, the rotor blades are balanced or otherwise tracked prior to operation. During the tracking process, the length of the pitch links coupled to the rotor blades may be adjusted, and other adjustments may be made to adjust configuration of the rotor blades to fly, so that the tip paths of the rotor blades are reasonably close to a same rotation track, or within a tip path plane corresponding to the rotation track. Sometimes, multiple adjustment iterations may be indicated, with multiple (or a series of) adjustments to various pitch links in the rotorcraft. Thus, in order to efficiently track the rotor blades, an installer or maintainer needs to be able to determine the amount of each pitch length adjustment per iteration and across all iterations.

A conventional approach involves an installer estimating how two parts of a pitch link move relative to each other to track pitch length adjustments. For example, without indicators, an installer may count wrenching flats on one side of a pitch link tube as the tube is turned during pitch length adjustment. This approach is inaccurate for finer adjustments, since some turns may turn the tube by less than the size of a flat. This approach is also difficult to visually assess, because of the small height of wrenching flats. Also, it is difficult to track movement of the wrenching flats. Accordingly, conventional approaches are cumbersome to keep track of a series of adjustments between different runs of the rotor blades during a tracking process.

One solution may be to create a pointer or window or other parts keyed into the existing structure of a pitch link, to visualize pitch length adjustments. However, keying in extra parts adds expense, complexity, and weight to the pitch link configuration. Also, keying in a pointer or window onto a part of the pitch link may create a stress-riser in the pitch link, and lead to cracking and failure of the pitch link.

Another solution would be to implement a micrometer arrangement on a pitch link with numbered indications on the body or other existing parts of the pitch link. The numbered indications would provide an actual measurement relating to the length of the pitch link. This arrangement could be offered as an alternative to conducting blade tracking procedures with gradual pitch length adjustments. However, a micrometer arrangement requires calibration of the pitch link with the added numbered indications, to ensure that the indicated length measurement is accurate. Otherwise, tolerance stack-ups for the various components in the main rotor assembly would make the indicated measurement unreliable. Unreliable measurements would affect the ability of such a micrometer arrangement to avoid conducting the blade tracking process, because there would be no other way to ensure proper length setting or adjustment to the pitch link.

Instead of the above described conventional approach and solutions, an alternative pitch link design implements a solution according to some embodiments described herein that provide an improved visual indication of how pitch length adjustments have moved (comparing a new position from a prior position). The solution is more accurate, simpler, causes less stress on the pitch link itself, does not require the same extent of calibration, and improves the efficiency of the blade tracking process.

In accordance with representative embodiments, a pitch link includes a series of easily-trackable pitch length adjustment indicators machined onto an outer surface of the pitch link tube, and a reference indicator machined onto an outer substantially vertical, substantially planar surface of the upper rod of the pitch link. The indicators include shallow-radius vertical grooves near the upper end of the pitch link, where the pitch link is coupled to a rotor blade. The track adjustment indicators and the reference indicator are positioned so that they remain uncovered and visible while the pitch length is being adjusted, making it easier to accurately read and track pitch length adjustments.

Representatively described systems and devices may be readily incorporated into an existing pitch link design, because none of the indicators are numbered. Having the indicators be unnumbered, avoids the need for calibration to ensure a certain alignment of the pitch link's tube and upper rod prior to machining the indicators onto them. Instead, track adjustment indicators can be machined into the tube and the reference indicator into the upper rod prior to threading the upper rod into the tube. Instead of identifying which numbered indicator indicates the starting point, the installer would mark a starting point when the pitch link is at its unadjusted nominal length, by marking the track adjustment indicator initially aligned with the reference indicator after installation.

Thus, the track adjustment indicators and reference indicator described below provide a visible indication of movement in pitch length adjustment that is easy-to-understand, cost-effective, easily-trackable, and accurate, that can be machined into a pitch link, without sacrificing expense or other functionality of the existing pitch link structure. The ultimate benefit is that the indicators enable an installer or other user to more efficiently and effectively make adjustments to track an installed rotor blade, and ensure safe operation of the rotorcraft.

FIG. 1 representatively illustrates rotorcraft 101 in accordance with some embodiments. Rotorcraft 100 has main rotor assembly 103 with a plurality of rotor blades 105a-105e, that are configured to rotate or otherwise move around principal axis 102. Rotorcraft 101 further includes body 107, tail boom 111, and tail rotor assembly 109 at end of tail boom 111, and landing gear 118 for ground support. It should be appreciated that rotorcraft 100 is merely illustrative of a variety of aircraft that can implement embodiments disclosed herein. In other embodiments, instead of tail rotor assembly 109, rotorcraft 101 may have a no-tail-rotor (NO-TAR) or dual main rotor system. Other aircraft implementations beyond rotorcraft 101 may include hybrid aircraft, tilt rotor aircraft, tandem rotorcraft, unmanned aircraft, gyrocopters, or the like.

Main rotor assembly 103 is equipped with a capability of driving movement of the rotor blades 105a-105e, and selectively controlling the pitch of each rotor blade 105a-105e. Selective pitch control includes the ability to implement collective and cyclic pitch variations. Pitch may also be referred to as the angle of attack for each of rotor blades 105a-105e, as the rotor blades 105a-105e move around principal axis 102. The ability to drive movement and selectively control pitch, enables the ability to adjust or otherwise control speed, direction, thrust, and lift of rotorcraft 101.

As rotor blades 105a-105e run around principal axis 102, the tips of rotor blades 105a-105e trace tip paths during cycles of rotation. When rotor blades 105a-105e are adequately balanced, the tip paths of rotor blades 105a-105e are substantially co-planar with one another, in a tip path plane, and form rotation track 110. Once balanced, the tip paths are sufficiently aligned along rotation track 110, or within a certain deviation from rotation track 110, during a running of rotor blades 105a-105e. Rotor blades 105a-105e may experience some span-wise flexion during rotation, and may be angled with collective and cyclic pitch adjustments, but the tip paths should remain substantially co-planar and sufficiently aligned along rotation track 110, with permissible deviations within a certain tolerance from rotation track 110. Rotation track 110, as defined in the tip path plane, may be substantially stationary and perpendicular to principal axis 102, but may also be dynamic and angled relative to principal axis 102, during cyclic pitch adjustments, or other adjustments or controls during flight.

Figure 2:
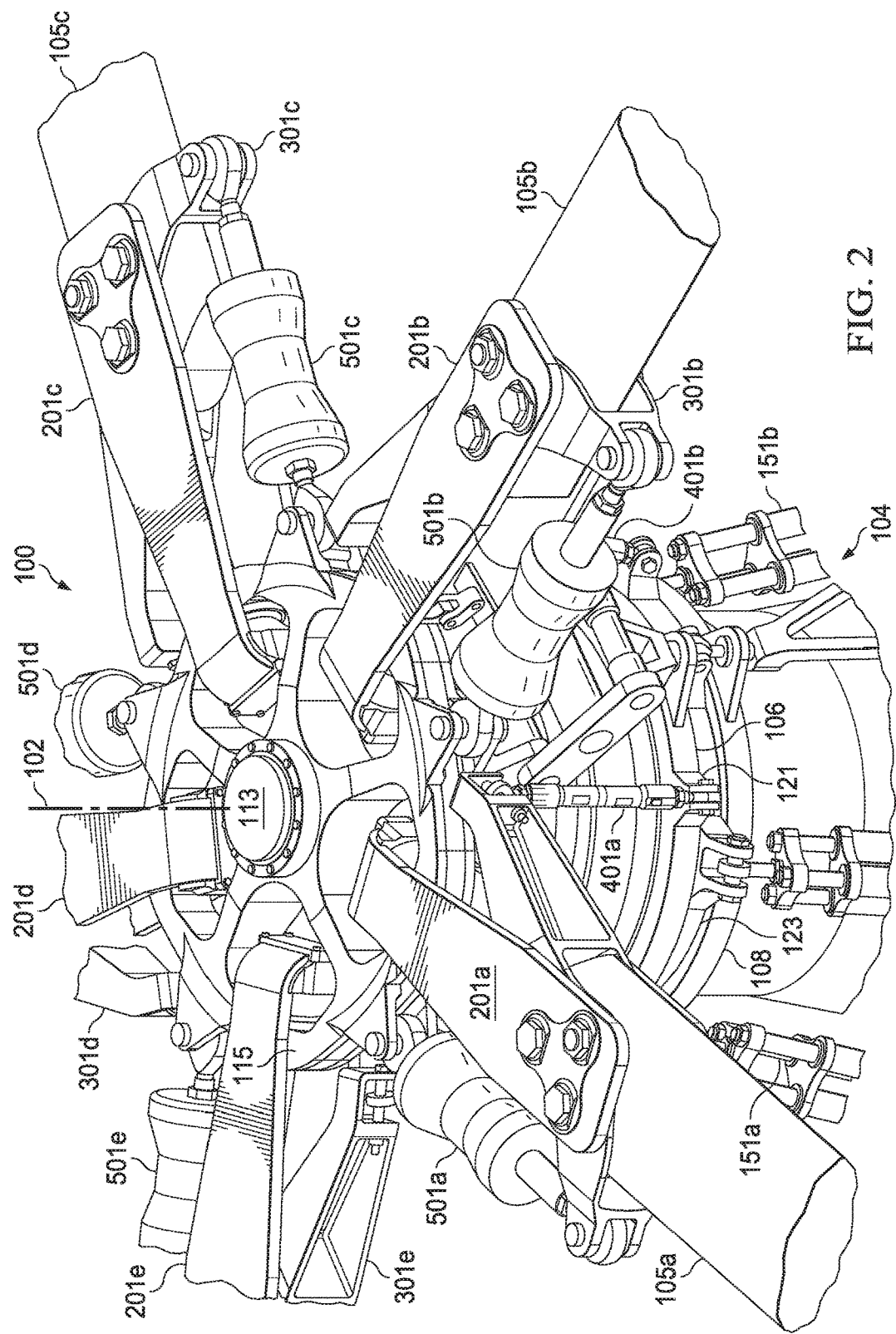
FIG. 2 is a perspective view of a representative main rotor assembly, according to some embodiments.
Figure 3:
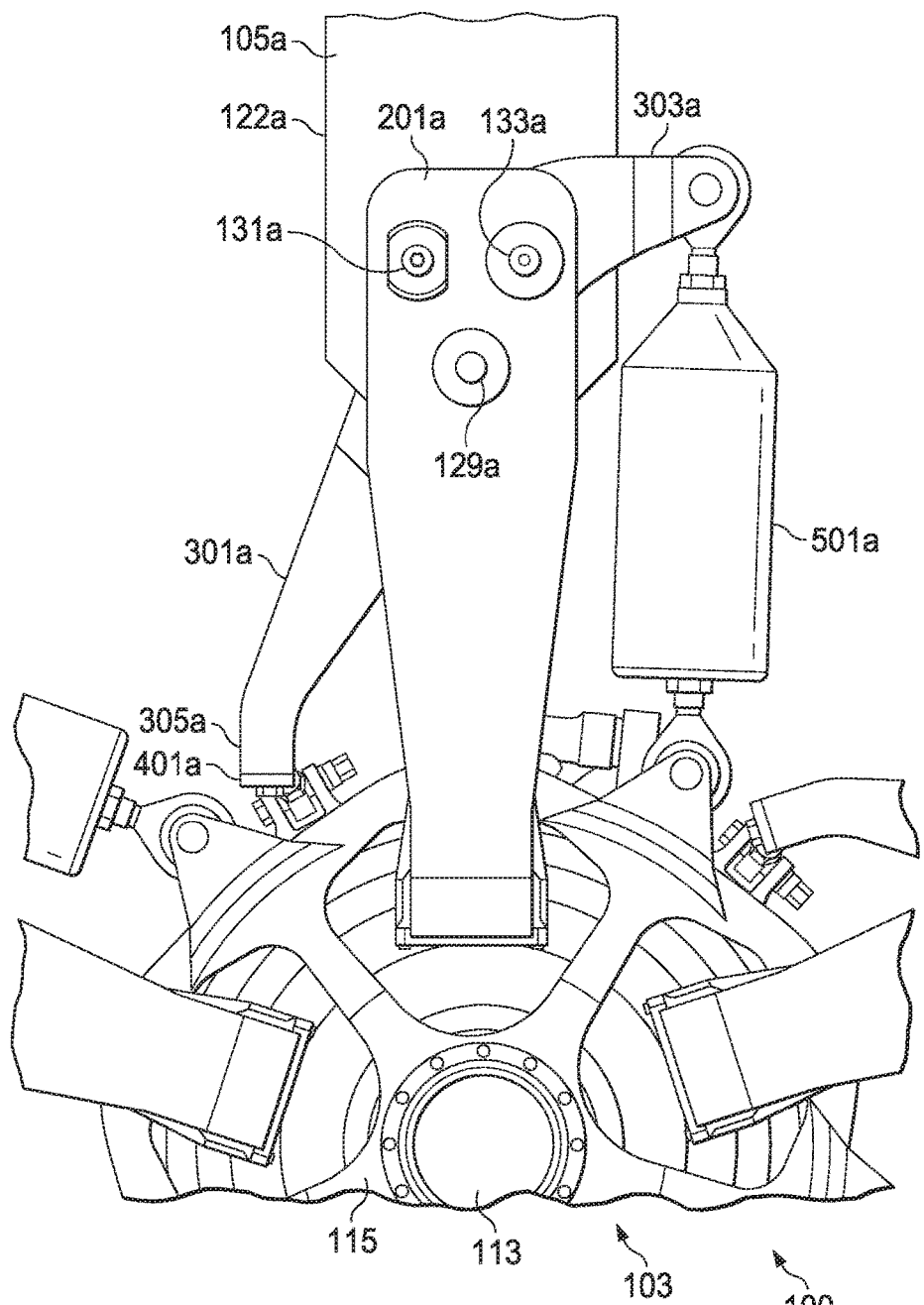
FIG. 3 representatively illustrates a top view of a pitch horn, a pitch link, a grip, a damper, and a rotor blade, coupled to the yoke and mast in the main rotor assembly of FIG. 2, according to some embodiments.

FIGS. 2-3 provide perspective views of main rotor assembly 103, according to some embodiments. Main rotor assembly 103 includes rotor blades 105a-105e, main rotor hub 100, driving controller 104, and rotating controller 106. Main rotor hub 100, driving controller 104, and rotating controller 106, are sometimes referred to together, as the pylon 112 in rotorcraft 101. Main rotor assembly 103 can be characterized as including rotor blades 105a-105e and pylon 112.

Main rotor hub 100 is coupled to rotor blades 105a-105e. Main rotor hub 100 accommodates the motion of rotor blades 105a-105e around principal axis 102. The motion around principal axis 102 is driven and controlled by driving controller 104. Rotating controller 106 controls collective and cyclic pitch of rotor blades 105a-105e.

Main rotor assembly 103 is representatively illustrated with five rotor blades 105a-105e (sometimes referred to as airfoils or wings with a curved cross-section) evenly spaced around mast 113. Mast 113 is a mechanism in driving controller 104 that drives rotation of rotor blades 105a-105e around principal axis 102. Principal axis 102 can be characterized as the axis extending along the length of mast 113. Main rotor hub 100 and rotating controller 106 include the other components of main rotor assembly 103 engaged with rotor blades 105a-105e, as further described below. Other embodiments of main rotor assembly 103 may have a different number or configuration of rotor blades or couplings between rotor blades and main rotor hub 100, driving controller 104, and rotating controller 106.

Main rotor hub 100 includes yoke 115, grips 201a-201e, pitch horns 301a-301e, and dampers 501a-501e. Yoke 115 is coupled to mast 113. Grips 201a-201e couple rotor blades 105a-105e to yoke 115. Each of pitch horns 301a-301e are coupled to grips 201a-201e and rotor blades 105a-105e. Dampers 501a-501e, may be included, as illustrated, for reducing vibration are attached, connected or otherwise coupled to rotor blades 105a-105e and yoke 115 (with damper 501e not being visible in FIG. 2, but should be understood to be similarly disposed as dampers 501a-501d).

In other embodiments, dampers may be omitted from main rotor hub 100 or other rotor assemblies. Mast 113 rotates around principal axis 102. Rotation of mast 113 rotates yoke 115, grips 201a-201e, rotor blades 105a-105e, and pitch horns 301a-301e, around principal axis 102.

Rotating controller 106 include swash plate 108, drive actuators 151a-151c, and pitch links 401a-401e (with drive actuator 151c and pitch links 401c-401e not being visible in FIG. 2, but should be understood to be similarly disposed as drive actuators 151a, 151b, and pitch links 401a, 401b). Swash plate 108 includes rotating ring 121 above non-rotating ring 123. Rotating ring 121 is coupled to yoke 115. In other embodiments, rotating ring 121 may be separately coupled to mast 113, without also being coupled to yoke 115. In either configuration, a rotation of mast 113 around principal axis 102, rotates rotating ring 121 around principal axis 102. There are three drive actuators 151a-151c controlling collective and cyclic pitch by changing position of swash plate 108 along principal axis 102, and by changing angling of rotating ring 121 and non-rotating ring 123 relative to principal axis 102. In other embodiments, rotating controller 106 may include fewer or more drive actuators.

Pitch links 401a-401e are coupled to pitch horns 301a-301e and rotating ring 121 in swash plate 108. Pitch links 401a-401e are engaged in effecting collective and cyclic pitch adjustments, by being displaced from displacement or angling of swash plate 108 relative to principal axis 102. Displacement of pitch links 401a-401e angles pitch horns 301a-301e (can be referred to as rotating pitch horns 301a-301e), changing pitch of rotor blades 105a-105e. While pitch links 401a-401e are engaged, rotor blades 105a-105e run along rotation track 110, within a permissible deviation, during pitch adjustments, because the length of each of pitch links 401a-401e is prescribed prior to running rotor blades 105a-105e.

Once the above parts are installed, rotorcraft is spooled up for tracking rotor blades 105a-105e. The tip paths of rotor blades 105a-105e may be misaligned, or may not by substantially co-planar with one another, or able to remain substantially aligned or close to rotation track 110, within a tolerable deviation. In that event, rotor blades 105a-105e (or any one of rotor blades 105a-105e) may be characterized as being unbalanced. There are a variety of reasons why any of rotor blades 105a-105e may be unbalanced after installation. There may be variations between rotor blades 105a-105e in shape, weight, size, or profile (e.g., arising during the manufacturing of rotor blades 105a-105e). Variations may also arise between grips 201a-201e, between pitch horns 301a-301e, and within yoke 115 and mast 113. Any one or more of the foregoing variations may result in tip paths of rotor blades 105a-105e deviating from rotation track 110 beyond a permissible tolerance. Deviations from rotation track 110 may affect the ability of a pilot to effectively steer and control rotorcraft 101.

In order to reduce or avoid such deviations after installation, rotorcraft 101 is spooled up for tracking rotor blades 105a-105e. Tracking involves running rotor blades 105a-105e (sometimes referred to as spooling up rotorcraft 101) and using cameras and radar, or other equipment, to identify and measures deviations of rotor blades 105a-105e from rotation track 110. Adjustments can be made in between runs of rotor blades 105a-105e. For example, tracking may reveal rotor blade 105a flying on a track two inches higher than rotation track 110.

Pitch links 401a-401e are configured with adjustable pitch lengths for calibrating pitch links 401a-401e to offset or reduce deviations of rotor blades 105a-105e from rotation track 110 in order to balance rotor blades 105a-105e during tracking, prior to routine operation of rotorcraft 101.

Tracking is performed repeatedly until rotor blades 105a-105e are sufficiently balanced with one another during rotation. Tracking is an iterative process, often involving intermittently running rotor blades 105a-105e and adjusting pitch links 401a-401e in between runs until achieving an optimal configuration. For example, after a first run, pitch link 401a may be adjusted to move rotor blade 105a closer to rotation track 110. A second run may show rotor blade 105b deviating from rotation track 110. Then, adjustments may be implemented on pitch link 401a. A third run may show rotor blade 105a still deviating from rotation track 110. Then, a second adjustment may be implemented on pitch link 401a, and so on. Since multiple adjustments may be done, pitch links 401a-401e are configured with indicators as described below with respect to pitch link 401a, enabling an installer to visualize each pitch length adjustment after each iteration and across all iterations. Visualizing the amount of each pitch length adjustment is sometimes referred to as gauging, counting, accounting, or estimating the pitch length adjustment. When tracking rotor blades 105a-105e is completed, pitch lengths are set, locked in or otherwise prescribed for stable operation of rotorcraft 101. Once prescribed, pitch links 401a-401e keep rotor blades 105a-105e tolerably within rotation track 110 at all times, whether maintaining pitch of rotor blades 105a-105e, or subjecting rotor blades 105a-105e to collective and/or cyclic pitch adjustment.

FIGS. 3-7 describe more fully a single rotor blade and single pitch link (i.e., rotor blade 105a and pitch link 401a), and the components associated therewith that are involved in pitch control and tracking. It should be understood that parts associated with the other rotor blades (e.g., rotor blades 105b, 105c, 105d and 105e) and other pitch links (e.g., pitch links 401b, 401c, 401d, and 401e) are similarly configured. It should also be understood that the adjustable length feature and pitch control capability provided with pitch links 401a-401e, can be adapted for use in other configurations of rotor hubs and rotor blades that may or may not include the components, as described herein, according to some embodiments.

As illustrated in FIG. 3, pitch horn 301a is attached to root end 122a of rotor blade 105a with grip 201a and bolts 129a, 131a, 133a. Root end 122a of rotor blade 105a is disposed inside pitch horn 301a, and pitch horn 301a is disposed inside grip 201a. Bolts 129a, 131a, and 133a, attach rotor blade 105a to grip 201a and pitch horn 301a. Grip 201a couples rotor blade 105a to yoke 115 in a joint with spacing that permits rotation of grip 201a with pitch horn 301a and rotor blade 105a to change pitch of rotor blade 105a. Outboard end 303a of pitch horn 301a couples damper 501a to rotor blade 105a. Inboard end 305a of pitch horn 301a couples pitch link 401a to rotor blade 105a at upper end 405a of pitch link 401a. Lower end 407a of pitch link 401a is coupled to rotating ring 121 in swash plate 108. Main rotor hub 100 may have a different configuration in other embodiments, e.g., with pitch link 401a being engaged with rotor blade 105a through mechanisms other than grip 201a and pitch horn 301a. In that event, pitch link 401a can still be utilized and adjustments made and tracked in a similar manner as those described herein.

FIGS. 4-7 representatively illustrate pitch link 401a in greater detail, including how pitch link 401a is configured and adjusted, and how adjustments are determined during tracking of rotor blade 105a. Pitch link 401a comprises a barrel or tube 409a, upper rod 441a, lower rod 443a, upper jam nut 435a, and lower jam nut 475a. Tube 409a has upper portion 413a, and lower portion 415a opposite upper portion 413a. Upper rod 441a couples pitch link 401a to pitch horn 301a at upper end 405a. Lower rod 443a couples pitch link 401a to rotating ring 121 at lower end 407a. Pitch link 401a has vertical axis 425a extending from upper end 405a to 407a. A distance from upper end 405a to 407a defines pitch length 461a. Pitch length 461 has an initial or nominal or unadjusted amount, and can later be increased or decreased as a post-installation adjustment while tracking rotor blade 105a, as further described below.

Upper rod 441a comprises upper head 402a and upper rod body 430a. Upper rod body 430a begins with upper neck 431a below upper head 402a. Upper rod body 430a extends downwards from upper head 402a into tube 409a for remaining length of upper rod 441a. Upper rod body 430a has upper rod exterior threading 434a. Upper rod body 430a is threaded into upper portion 413a of tube 409a as described below. Upper jam nut 435a is disposed on upper rod body 430a below upper neck 431a, and above upper portion 413a of tube 409a.

In order to couple pitch link 401a to pitch horn 301a, pitch link 401a has a first opening through upper head 402a in upper rod 441a. The first opening is representatively referred to as upper opening 403a. Upper opening 403a is lined with upper spherical bearing 404a, permitting pitch link 401a to rotate when coupled in position to pitch horn 301a. Upper opening 403a is wide enough for a pin (not shown) to pass through and couple upper head 402a in position to inboard end 305a of pitch horn 301a.

At lower end 407a, pitch link 401a includes lower rod 443a, below tube 409a. Lower rod 443a comprises lower head 472a and lower rod body 470a. Lower rod body 470a begins with lower neck 471a above lower head 472a. Lower rod body 470a extends upwards from lower head 472a into tube 409a for remaining length of lower rod 443a. Lower rod body 470a has lower rod exterior threading 474a. Lower rod body 470a is threaded into lower portion 415a of tube 409a as further described below. Lower jam nut 475a is disposed on lower rod body 470a above lower neck 471a, and below lower portion 415a of tube 409a.

In order to couple pitch link 401a to rotating ring 121 at lower end 407a, pitch link 401a has a second opening through lower head 472a in lower rod 443a. The second opening is representatively referred to as lower opening 406a. Pitch length 461a from upper end 405a to lower end 407a may specifically refer to a distance from upper opening 403a to lower opening 406a.

Lower opening 406a is lined with lower spherical bearing 408a, permitting pitch link 401a to rotate when coupled in position to rotating ring 121. A pin (not shown) through lower opening 406a couples lower end 407a of pitch link 401a into position in rotating ring 121.

Once installed and coupled into position, lower end 407a of pitch link 401a rotates at the same (or substantially same) velocity and acceleration as upper end 405a, by being coupled to pitch horn 301a and rotating ring 121. Pitch horn 301a and rotating ring 121 also rotate at substantially the same velocity and acceleration as one another, because both are coupled to yoke 115 that rotates with mast 113 around principal axis 102.

Once pitch link 401a is installed, upper head 402a and lower head 472a are coupled into position. Pins (not shown) through upper opening 403a, and lower opening 406a, prevent or otherwise restrict rotation of upper rod 441a and lower rod 443a beyond a certain tolerance. Then, the positioning and orientation of upper rod 441a and lower rod 443a are secured (or substantially secured) relative to pitch horn 301a and rotating ring 121, except for rotation of pitch link permitted inside cavities (not shown) of pitch horn 301a and rotating ring 121.

Since upper rod 441a and lower rod 443a are secured, pitch length 461a is adjustable, after installation, by turning tube 409a around vertical axis 425a. In order to adjust and lock pitch length 461a of pitch link 401a during and after tracking rotor blade 105a, upper jam nut 435a and lower jam nut 475a are loosened or turned away relative to tube 409a. Then, pitch length 461a is adjusted by turning tube 409a around vertical axis 425a. Since upper rod 441a and lower rod 443a are threaded into tube 409a, in a similar orientation, but with a different thread pitch or density (as further described below), turning tube 409a, results in longitudinally displacing tube 409a along vertical axis 425a, relative to upper rod 441a and lower rod 443a. Once an adjustment is completed or made, upper jam nut 435a and lower jam nut 475a are tightened, turned, or torqued closer to tube 409a to secure tube 409a vertically in place relative to upper rod 441a and lower rod 443a.

Tube 409a permits post-installation adjustment of pitch length 461a, by virtue of its structure and because upper rod 441a and lower rod 443a are threaded into tube 409a. Tube 409a comprises tube body 410a, upper insert 451a, and lower insert 455a. Upper insert 451a is disposed at upper portion 413a of tube 409a. Lower insert 455a is disposed at lower portion 415a of tube 409a. Tube body 41a may comprise aluminum, or other light-weight metal or composite material. Upper insert 451a and lower insert 455a may comprise steel, or other metal or material, including a light-weight metal or composite material.

Upper insert 451a comprises upper hex flange 452a and upper insert body 453a extending vertically axially away from upper hex flange 452a. Upper insert 451a is threaded into upper tube cavity 454a at upper portion 413a of tube 409a. Upper hex flange 452a is wider than upper tube cavity 454a. Upper hex flange 452a is positioned on top of tube body 410 at upper portion 413a. Wrenching flats, e.g., flats 439a-1 or 439a-2 on upper hex flange 452a, are used to torque upper jam nut 435a in either direction, to loosen upper jam nut 435 before an adjustment to pitch length 461a, and to tighten upper jam nut 435a after an adjustment to pitch length 461a.

Tube 409a may be turned relative to upper rod 441a and lower rod 443a manually by twisting tube 409a after loosening upper jam nut 435a and lower jam nut 437a.

Upper insert body 453a is threaded along its interior and exterior. The interior threading on upper insert body 453a is referred to as upper insert interior threading 462a. Upper rod 441a is inserted into tube 409a at upper portion 413a by threading upper rod body 430a into upper insert body 453a. Upper insert body 453a is bonded to an interior of tube body 410a. Threading upper rod body 430a into upper insert body 453a engages upper insert interior threading 462a with upper rod exterior threading 434a on upper rod body 430a.

The exterior threading on upper insert body 453a is referred to as upper insert exterior threading 463a. Upper insert exterior threading 463a is compatible with and engages upper tube cavity threading 464a. An adhesive (not shown) may be applied on upper insert exterior threading 463a. After adhesive is applied, upper insert body 453a is threaded into upper tube cavity 454a. The adhesive bonds or secures upper insert body 453a to tube body 410a. The adhesive bonds or secures upper insert body 453a to tube body 410a once fully inserted into upper tube cavity 454a. Additional adhesive (not shown) may also be applied to an underside of upper hex flange 452a prior to inserting upper insert body 453a into upper tube cavity 454a. The additional adhesive may further bond or secure upper insert 451a to tube body 410a.

Lower insert 455a comprises lower hex flange 456a and lower insert body 457a extending vertically axially upwards from lower hex flange 456a. Lower insert 455a is threaded into lower tube cavity 458a at lower portion 415a of tube 409a. Lower hex flange 456a is wider than lower tube cavity 458a. Lower hex flange 456a is positioned below the bottom of tube body 410 at lower portion 415a and can be engaged in turning tube 409a, similar to upper hex flange 452a. Wrenching flats on lower hex flange 456a, are used to torque lower jam nut 437a in either direction, to loosen lower jam nut 437 before an adjustment to pitch length 461a, and to tighten lower jam nut 437a after an adjustment to pitch length 461a.

Lower insert body 457a is threaded along its interior and exterior. The interior threading on lower insert body 457a is referred to as lower insert interior threading 466a. Lower rod 443a is inserted into tube 409a at lower portion 415a by threading lower rod body 470a into lower insert body 457a. Lower insert body 457a is bonded to an interior of tube body 410a. Threading lower rod body 470a into lower insert body 457a engages lower insert interior threading 466a with lower rod exterior threading 474a on lower rod body 470a.

The exterior threading on lower insert body 457a is referred to as lower insert exterior threading 467a. Lower insert exterior threading 467a is compatible with and engages lower tube cavity threading 468a. An adhesive (not shown) may be applied on lower insert exterior threading 467a. After adhesive is applied, lower insert body 457a is threaded into lower tube cavity 458a. The adhesive bonds or secures lower insert body 457a to tube body 410a once fully inserted into lower tube cavity 458a. Additional adhesive (not shown) may also be applied to an underside of lower hex flange 456a prior to inserting lower insert body 457a into upper tube cavity 454a. The additional adhesive may further bond or secure lower insert 455a to tube body 410a.

Upper rod 441a has upper rod exterior threading 434a that is right-handed. Lower rod 443a has lower rod exterior threading 474a that is also right-handed. The thread density of upper rod exterior threading 434a and lower rod exterior threading 474a may be referred to as the thread pitch. The thread density of lower rod exterior threading 475a is lower than the thread density of upper rod exterior threading 434a. Therefore, upper rod exterior threading 434a and lower rod exterior threading 474a have the same oriented threading, but with thread densities that differ from one another. A difference between the thread densities of upper rod exterior threading 434a and lower rod exterior threading 474a indicates the amount by which one turn of tube 409a vertically adjusts pitch length 461a along vertical axis 425a. The different thread densities enable finer adjustments to pitch length 461a during tracking of rotor blade 105a. Finer adjustment capability permits finer calibration of pitch link 401a and finer tuning overall for tracking rotor blade 105a relative to other rotor blades 105b-105e.

Other configurations are possible in alternative embodiments. For example, upper rod exterior threading 434a may have lower thread density in comparison to the thread density of lower rod exterior threading 474a. Upper rod exterior threading 434a and lower rod exterior threading 474a may have the same thread densities. Upper rod exterior threading 434a and lower rod exterior threading 474a may be both be left-handed, instead of right-handed. In a different turnbuckle arrangement, upper rod exterior threading 434a may be left-handed while lower rod exterior threading 474a may be right-handed, or vice versa. In a turnbuckle arrangement, a sum of the thread densities or pitch of upper rod exterior threading 434a and lower rod exterior threading 474a (instead of a difference) will indicate the amount by which one turn of tube 409a vertically adjusts pitch length 461a along vertical axis 425a. In yet other alternative embodiments, threading may be replaced by other means of adjusting positions of upper rod 441a and lower rod 443a in tube 409a, such as a slot or ratchet system (not shown) permitting direct vertical axial displacement of the upper rod 441 and lower rod 443a relative to tube 409a.

Figure 4:
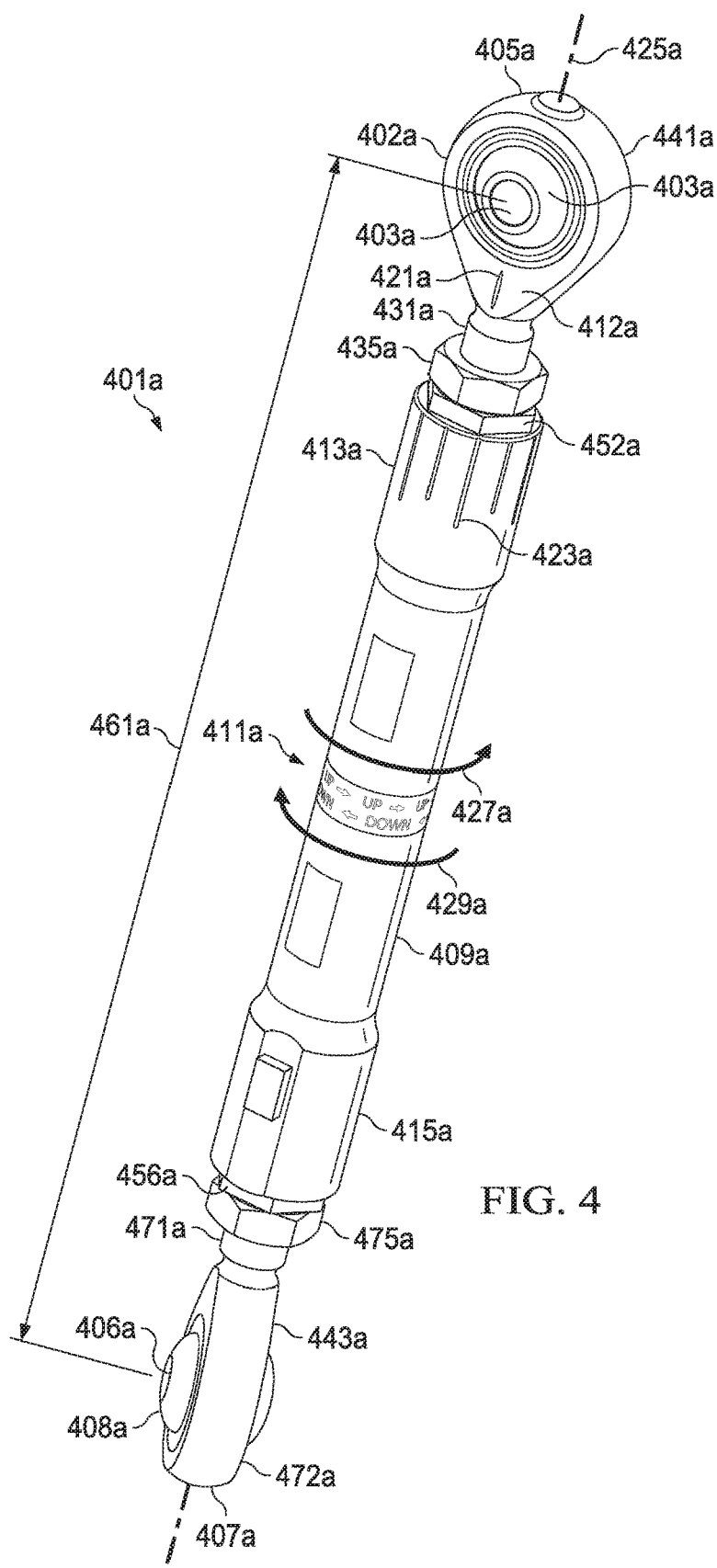
FIG. 4 is a perspective view of a representative pitch link in the main rotor assembly of FIG. 2, with a partial enlargement of mid-tube labeling, according to some embodiments.
Figure 5:
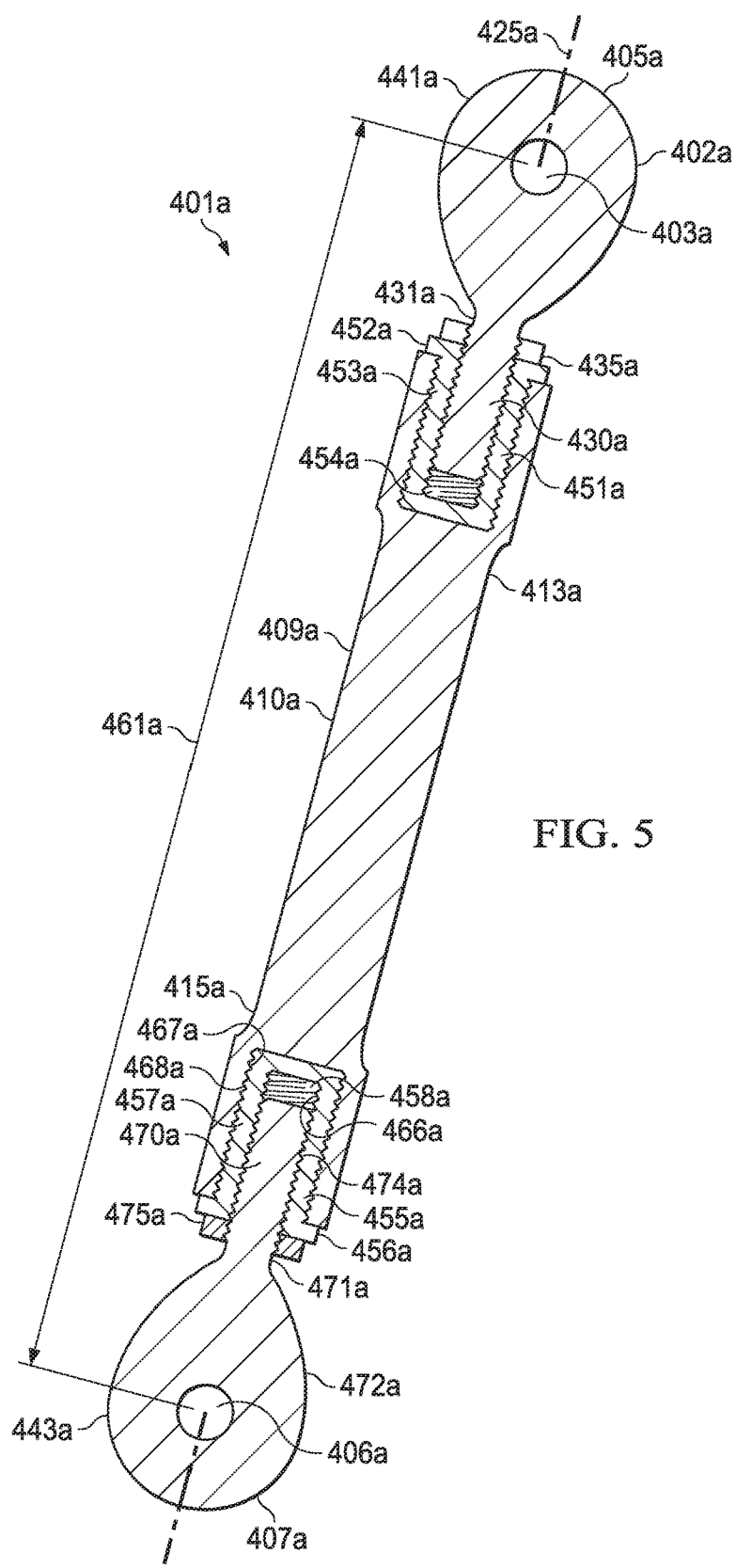
FIG. 5 is a section view of the representative pitch link of FIG. 4, according to some embodiments.

In the embodiment representatively illustrated in FIGS. 4 and 5, pitch length 461a is increased by turning tube 409a around vertical axis 425a in a first direction 427a. During tracking, pitch length 461a can be decreased by turning tube 409a around vertical axis 425a in a second direction 429a that is opposite first direction 427a. First direction 427a is counter-clockwise and second direction 429a is clockwise. Label 411a may be machined or casted or affixed on surface of tube 409a. Label 411a provides indicators that show which way to turn tube 409a for a desired adjustment of pitch length 461a. "UP" is indicated with an accompanying arrow for first direction 427a and "DOWN" is indicated with an accompanying arrow in the opposite direction for second direction 429a.

An installer or other user can reasonably expect to make multiple adjustments to pitch length 461a while tracking rotor blade 105a, possibly across numerous runs of rotor blade 105a, as part of an iterative process, until achieving an optimal balance between rotor blade 105a and other rotor blades 105b-105e. Therefore, multiple runs and adjustments may be made, by repeatedly tightening upper jam nut 435a and lower jam nut 475a for a run, loosening them after the run for adjusting pitch length 461a, and tightening them up again for a subsequent run of rotor blade 105a. A final tightening of upper jam nut 435a and lower jam nut 475a locks or prescribes pitch length 461a of pitch link 401a. Unlike other pitch link designs, there are no deformable tabs or other parts that need to be added in order to lock or prescribe pitch length 461a after making a single or multiple adjustments.

Tube 409a and upper rod 441a have indicators machined into them to assist a user to track or determine an amount of each adjustment to pitch length 461a and a total adjustment to pitch length 461a over a series of iterations. Indicators include track adjustment indicators 423a and a reference indicator 421a. Track adjustment indicators 423a are machined into outer surface of tube body 410a at or near upper portion 413a. Reference indicator 421a is machined into outer surface of upper head 402a of upper rod 441a at a bottom 412a of a first vertical plane side 414a of upper head 402a. Track adjustment indicators 423a and reference indicator 421a enable users (e.g., installers, maintainers, or the like) to readily and efficiently track and count or record adjustments to pitch length 461a after each run and across all runs until concluding the iterations in the tracking process for rotor blade 105a.

Figure 6:
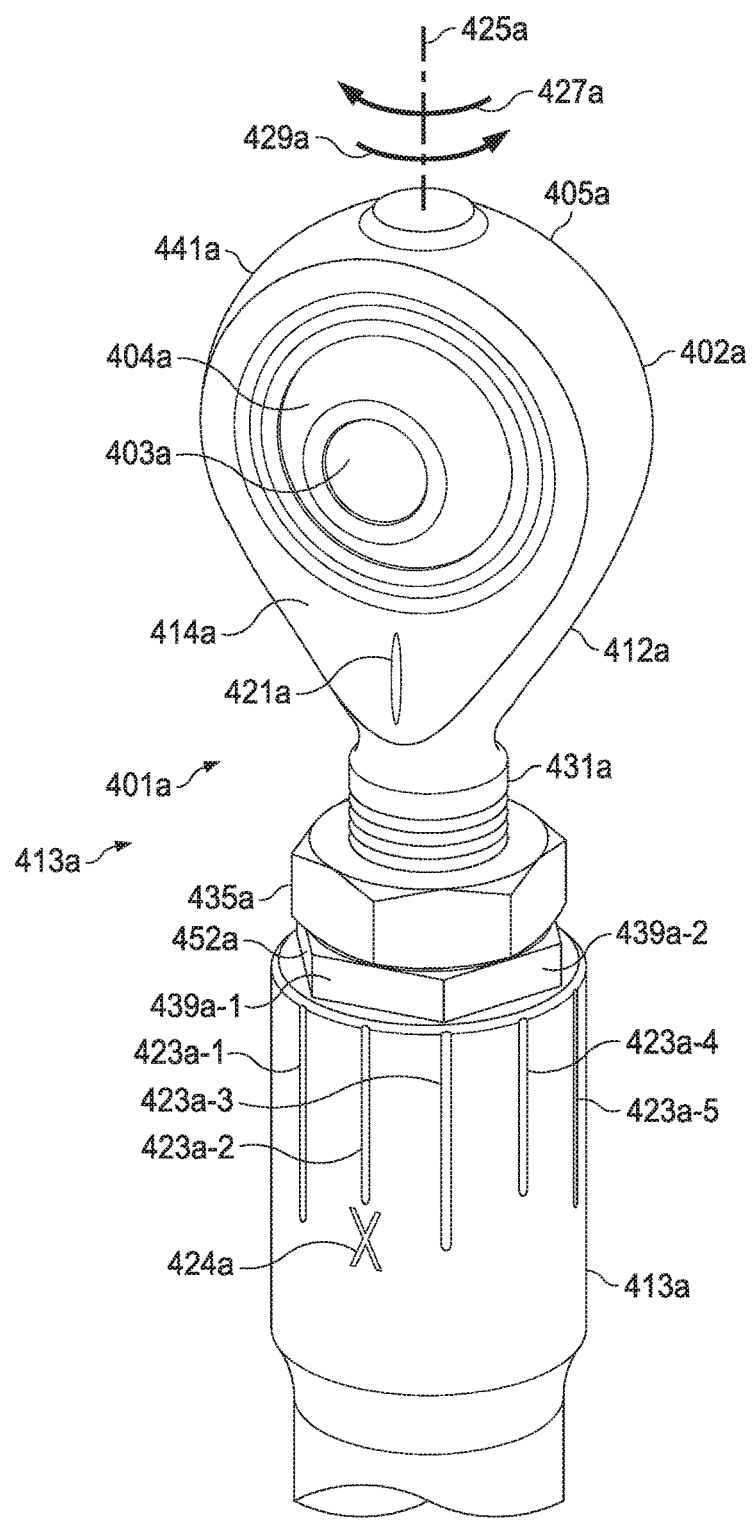
FIG. 6 is a partial perspective view of the upper end of the pitch link of FIG. 4, according to some embodiments.
Figure 7:
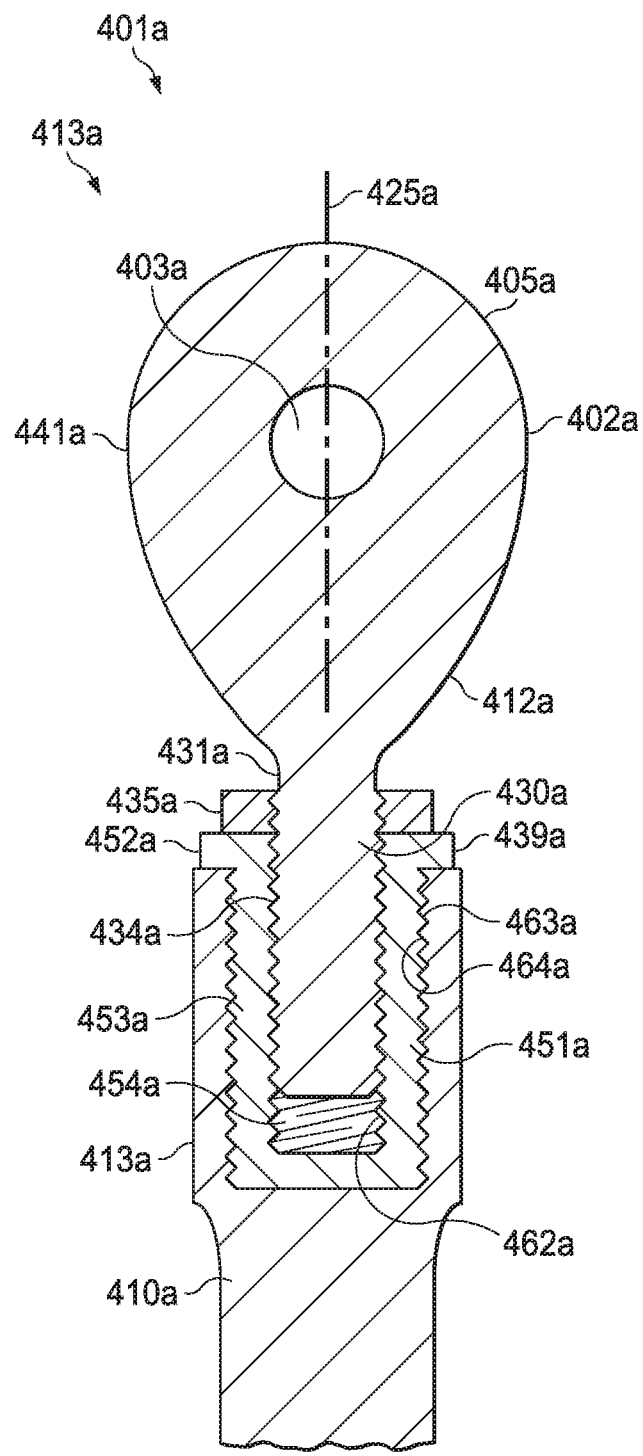
FIG. 7 is a section view of the upper end of the pitch link of FIG. 6, according to some embodiments.

In a representative aspect, track adjustment indicators 423a comprises twelve vertical hash-marks or semi-circular small radius vertical grooves evenly spaced around circumference of tube body 410a at upper portion 413a. FIG. 6 representatively illustrates track adjustment indicators 423a-1, 423a-2, 423a-3, 423a-4 and 423a-5. It should be understood that in some embodiments, the other seven track adjustment indicators are not shown, but continue in the same pattern and spacing as 423a-1 through 423a-5. Track adjustment indicators 423a are parallel to vertical axis 425a and alternate in length to aid readability and counting. Track adjustment indicators 423a begin at a top edge of upper portion 413a and extend down towards lower portion 415a. Track adjustment indicators 423a-1, 423a-3 and 423a-5 are longer than track adjustment indicators 423a-2 and 423a-4. In other embodiments, there may be more or less than twelve track adjustment indicators 423a around tube body 410a, track adjustment indicators 423a may be non-equally spaced apart, they may have the same length or have more than two variations in length.

Reference indicator 421a at bottom of upper head 402a is machined below a center of upper opening 403a and is a vertical line or groove or hash parallel to vertical axis 425a. Reference indicator 421a marks a reference starting position for rotation or adjustment of pitch length 461a that is parallel to vertical axis 425a through a center of pitch link 401a. Reference indicator 421a is machined into an outer surface of a first vertical plane side 414a of upper head 402a. Reference indicator 421a is used as reference to count or track how many track adjustment indicators 423a have passed relative to reference indicator 421a as tube 409a is turned relative to upper rod 441a and lower rod 443a.

Prior to any adjustments of pitch length 461a, marking 424a may be applied to track adjustment indicator 423a-2 on tube body 410 that is aligned with reference indicator 421a. Once applied, marking 424a marks the starting point to count or track any subsequent adjustments to pitch length 461a, by counting how many other track adjustment indicators 423a pass reference indicator 421a after track adjustment indicator 423a-2. Together, reference indicator 421a and track adjustment indicators 423a with marking 424a, provide a way to visualize the degree of rotation of tube 409a done to adjust pitch length 461a.

A user can translate the visual indication of counting or tracking the passing of track adjustment indicators 423a past reference indicator 421a into an amount of pitch length adjustment, based upon knowledge of the nominal amount of pitch length 461a of pitch link 401a, density of track adjustment indicators 423a and threading densities inside pitch link 401a. For example, in the case that a nominal or starting amount for pitch length 461a is approximately 18.480 inches, a full 360 degree turn of tube 409a changes pitch length 461a by approximately 0.021 inches. A partial turn of tube 409a between two consecutive track adjustment indicators of twelve track adjustment indicators 423a-1- 423a-12, e.g., changing track adjustment indicator lined up with reference indicator 421a from track adjustment indicator 423a-2 with marking 424a to track adjustment indicator 423a-3, or a 30 degree turn, changes pitch length 461a by approximately 0.0018". There may be margins of error that can be determined with a detailed tolerance stack-up analysis, however the magnitude of the margins of error from these known adjustment amounts tends to be insignificant relative to the magnitude of the measurements or amounts themselves.

However, it is not necessary to calculate or measure out the actual adjustments to pitch link 461a. The track adjustment indicators 423a and reference indicator 421a are used to visually indicate relative adjustments in pitch link 401a until a visual analysis of tracking indicates sufficient balancing of rotor blades 105a-105e. Additionally, the configuration of indicators provided by track adjustment indicators 423a and reference indicator 421a, and marking 424a offer a number of other advantages over other solutions for assessing each adjustment to pitch length 461a, as described below.

First, track adjustment indicators 423a and reference indicator 421a provide an effective and efficient means for counting finer adjustments to pitch length 461a. In the absence of indicators, a user would have to rely upon counting wrenching flats, e.g., flats 439a-1 or 439a-2, on upper hex flange 452a to track turns or rotations of tube 409a and resulting vertical adjustments to pitch length 461a. It is difficult to track how many of wrenching flats on upper hex flange 452a have moved past a reference point. Counting flats is less accurate and limits a user's ability to effectively count smaller incremental turns of tube 409a for finer adjustments to pitch length 461a. Wrenching flats on upper hex flange 452a, e.g., flats 439a-1 and 439a-2, are wider than a distance between, e.g., track adjustment indicators, 423a-1 and 423a-2. A user will not be able to track or count smaller incremental turns of tube 409a that shift half or any fraction less than a whole flat past a self-marked reference point on pitch link 401a.

Second, since track adjustment indicators 423a are not numbered, it is easier to machine in more easy-to-read track adjustment indicators 423a around the circumference of upper portion 413a of tube 409a that provide finer granularity for tracking smaller adjustments to pitch length 461a. In some embodiments, providing twelve track adjustment indicators 423a permit estimating adjustments due to turns in increments of substantially thirty (30) degrees, as well as fifteen (15) degree turns that can be estimated by noting when a midpoint between two track adjustment indicators 423a pass reference indicator 421a.

Third, manufacture and assembly of pitch link 401a is streamlined with unnumbered track adjustment indicators 423a. Without numbering, there is no need to ensure alignment of a numbered track adjustment indicator prior to installation to mark the unadjusted initial position for pitch length 461a. Alignment would be more complicated with numbered track adjustment indicators, because no two pitch links, e.g., pitch links 401a-401b, could be manufactured with identical shapes and sizes and assembled exactly to specification, potentially requiring calibration or other pre-installation adjustments to pitch links 401a and 401b.

Track adjustment indicators 423a do not have to be numbered to identify a position of tube 409a correlated with the initial or nominal or unadjusted length for pitch length 461a. Instead, prior to any adjustments, a user may identify the starting point by identifying or marking the one of track adjustment indicators 423a (e.g., track adjustment indicator 423a-2) that is aligned with reference indicator 421 with marking 424, prior to making any adjustments to pitch length 461a.

Fourth, track adjustment indicators 423a are easier to visually track because all are disposed on upper portion 413a of tube 409a (as opposed to lower portion 415a), as a result of upper end 405a and lower end 407a having the same oriented threading. As previously described, upper rod exterior threading 434a and lower rod exterior threading 474a are both right-handed. Pitch length 461a is adjusted in the same direction along vertical axis 425a when tube 409a is turned about vertical axis 425a, because upper rod 441 and lower rod 443a have the same oriented threading. Since adjustments occur in the same direction at both upper end 405a and lower end 407a, it is not necessary to count or determine an amount of adjustments at lower rod 443a separately from adjustments at upper rod 441a. Therefore, track adjustment indicators 423a are provided on only upper portion 413a. There are no track adjustment indicators on lower portion 415a.

Fifth, track adjustment indicators 423*a* and reference indicator 421*a* can be relied upon for repeatedly tracking adjustments to pitch length 461*a* for the entire time that pitch link 401*a* remains in operation and use in rotorcraft 101. For example, tracking may have to be done again if rotor blade 105*a* is replaced. In that event, pitch length 461*a* may be adjusted back to its nominal or initial amount, and tracking done again with the same tracking adjustment indicators 423*a* and reference indictor 421*a* that were relied upon in the first installation. This is because track adjustment indicators 423*a* and reference indicator 421*a* are permanent markings integrated into the tube body 410*a* and upper rod 441*a*.

Sixth, track adjustment indicators 423*a* and reference indicator 421*a* provide the permanent markings in an integrated manner that avoids creating stress risers or stress concentration in parts of pitch link 401*a*. In contrast, keying in separate parts, e.g., with a keyway or a metal pointer, by machining a groove to permanently attach the separate part to pitch link 401*a* could create stress risers in pitch link 401*a*. Stress risers can lead to failure of pitch link 401*a* during operation of rotorcraft 101. In order to meet structural requirements, such a pitch link 401*a* would have to be "beefed up" for a given application, adding weight to the part. Avoiding a keyway avoids this undesirable outcome. Thus, avoiding reliance upon any separate attached parts avoids adding complexity to installation, and avoids creating an added expense and weight to main rotor assembly 103.

Seventh, track adjustment indicators 423*a* and reference indicator 421*a* are more efficient for tracking adjustments by remaining entirely visible and uncovered regardless of how much pitch length 461*a* is decreased or increased. In contrast, machining indicators into upper rod body 430*a*, e.g., such as horizontal markings across upper rod body 430*a* would not remain visible and uncovered during adjustment. Upper rod body 430*a* is inserted and removed relative to tube body 410*a* during adjustments to pitch length 461*a*. So, indicators on upper rod body 430*a* would be selectively covered by tube body 410*a* during the course of adjustment. Indicators that become selectively covered are harder to read or track as they become covered and uncovered during each round of tracking. Also, indicators on upper rod body 430*a* would be less reliable for repeated use during the life of pitch link 401*a*. Indicators on upper rod body 430*a* could become worn or more difficult to read during successive iterations. Upper insert exterior threading 463*a* may begin to wear or scratch an outer surface of upper rod body 430*a*, blurring or removing indicators on upper rod body 430*a*.

In other embodiments, pitch link 401*a* can be designed with tracking adjustment indicators 423*a* and reference indicator 421*a* instead towards lower end 407*a* of pitch link 401*a*. A different configuration of rotor assembly 103 may make the lower end 407*a* of pitch link 401*a* more visible during adjustments to pitch length 461*a*. In that case, track adjustment indicators 423*a* are machined onto lower portion 415*a* of tube 409*a*, and reference indicator 421*a* is machined onto lower head 472*a* of lower rod 443*a*. Then, the pitch link 401*a* otherwise functions and is configured as described herein.

In view of the foregoing, it should be understood that, with respect to parts of the pitch link 401*a*, "upper" and "lower" indicate dispositions of parts and directions that are opposite relative to one another across pitch link 401*a*, as opposed to "upper" and "lower" indicating an absolute orientation relative to the rest of rotorcraft 101 or the ground.

Figure 8:
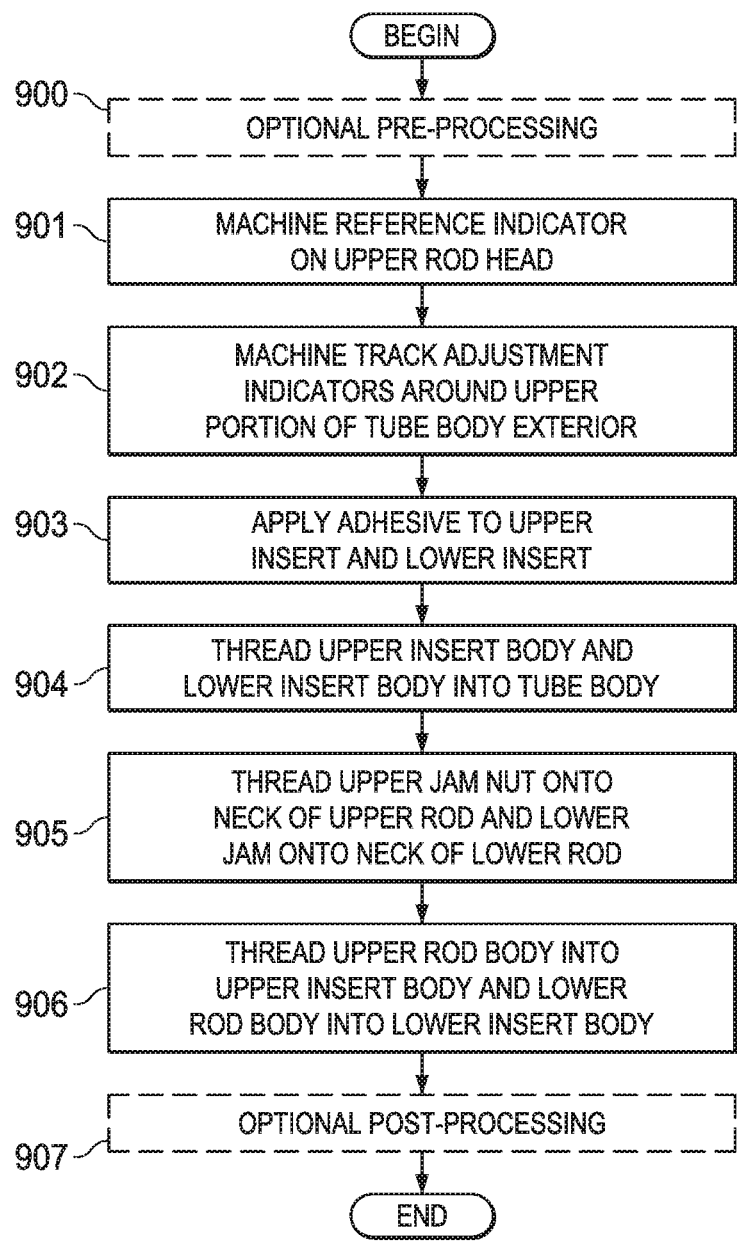
FIG. 8 illustrates a block diagram of a representative method of configuring and assembling a pitch link, according to some embodiments.
Figure 9:
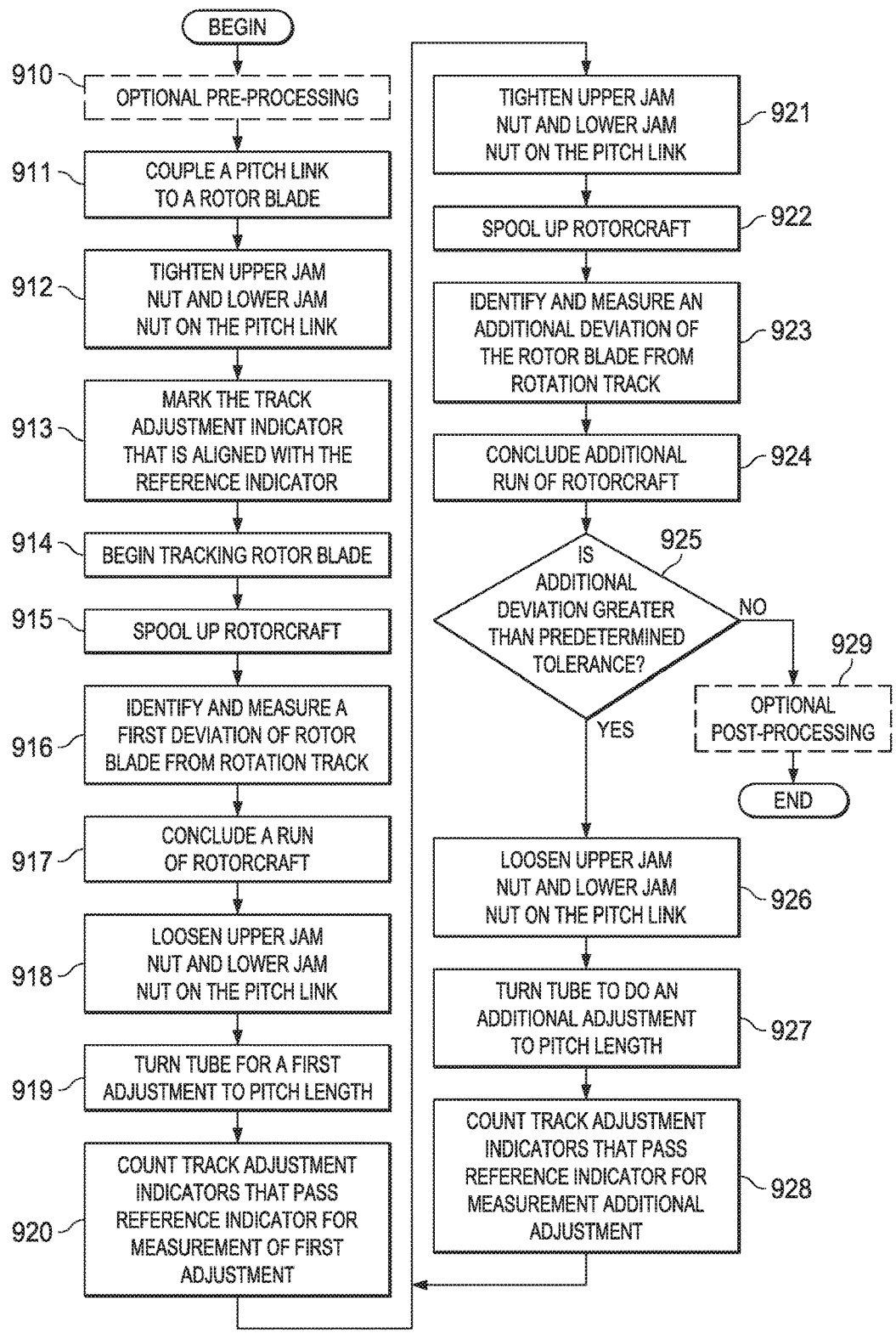
FIG. 9 illustrates a block diagram of a representative method of tracking a rotor blade installed in a rotorcraft, according to some embodiments.
Figure 10:
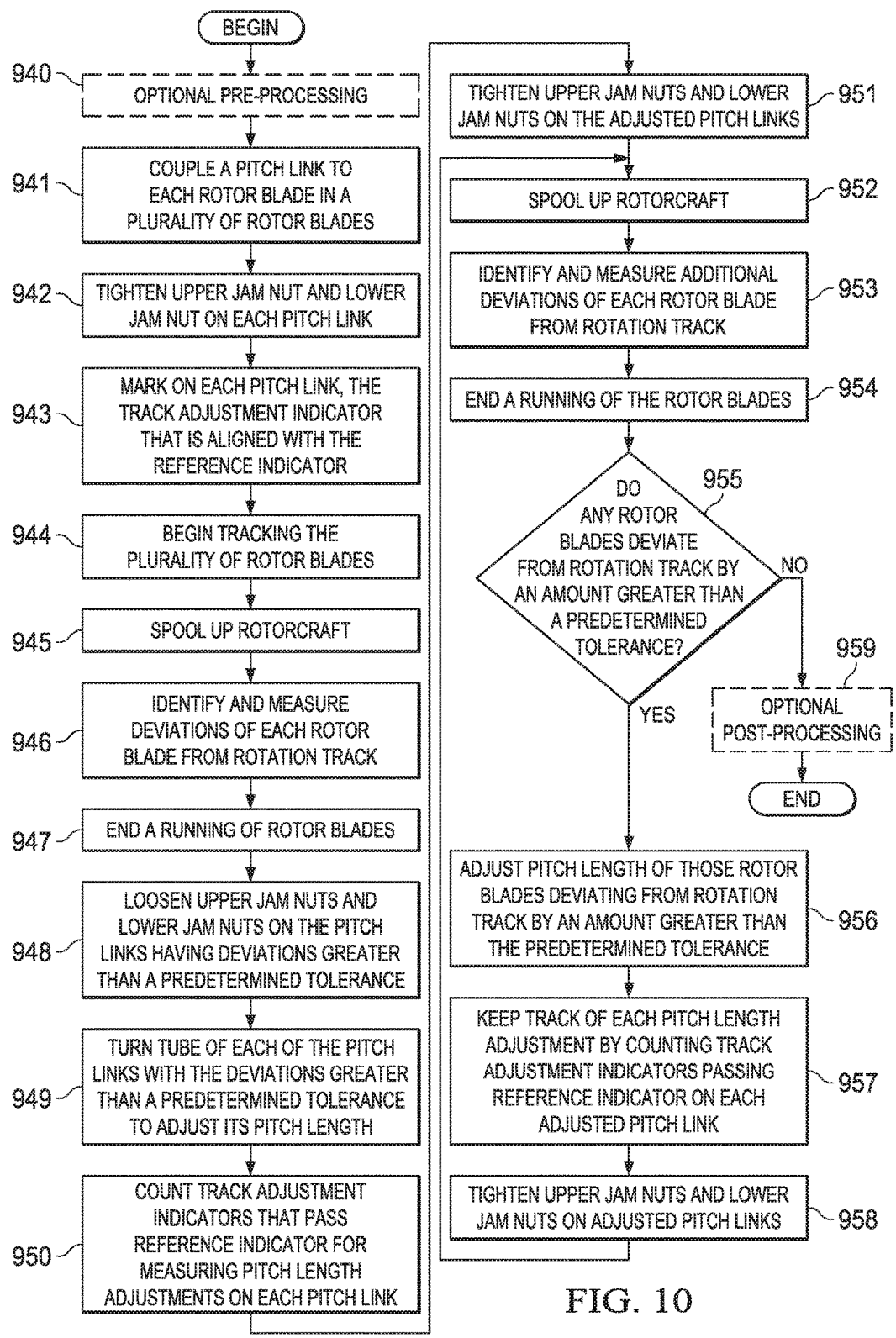
FIG. 10 illustrates a block diagram of a representative method of tracking a plurality of rotor blades installed in a rotorcraft, according to some embodiments.

FIGS. 8-10 illustrate representative methods of assembling pitch links, and tracking installed rotor blades with pitch length adjustments. FIG. 8 representatively illustrates at steps 900-907, a method of assembling a pitch link. Step 900 is an optional step of pre-processing that may include manufacturing, or otherwise preparing, components of the pitch link for assembly. Step 901 includes machining a reference indicator as a vertical shallow groove below upper opening in upper rod head. Step 902 includes machining a plurality of track adjustment indicators around exterior of upper portion of tube body. Step 903 includes applying adhesive onto an exterior of upper insert and lower insert. Step 904 includes threading upper insert body and lower insert body into tube body. Step 905 includes threading upper jam nut onto neck of upper rod, and lower jam nut onto neck of lower rod. Step 906 includes threading upper rod body of upper rod into upper insert body of tube, and threading lower rod body of lower rod into lower insert body of tube. Step 907 includes an optional post-processing step that may comprise performing various other adjustments to pitch link components prior to installation.

FIG. 9 representatively illustrates a method for tracking a rotor blade, including adjusting pitch length and determining adjustments of the pitch length coupled to the rotor blade, at steps 910-929. Step 910 is an optional step of pre-processing that may include installing the rotor blade and/or pitch link, and making other adjustments in main rotor assembly to prepare for tracking rotor blade. Step 911 includes coupling a pitch link to a rotor blade in a main rotor assembly. Step 912 includes tightening upper jam nut and lower jam nut on the pitch link. Step 913 includes marking the track adjustment indicator aligned with the reference indicator, as a starting point at which the pitch link is at its nominal or initial or unadjusted length. Step 914 includes beginning tracking the rotor blade. Step 915 includes spooling up the rotorcraft. Step 916 includes identifying and measuring a first deviation of the rotor blade from the rotation track. Cameras and radars can be used for capturing and measuring the first deviation in multiple dimensions. For example, there could be two camera-radar combination sets set up at a point along a rotation track. The first set could be configured to capture and measure the first deviation along an x-axis. The second set could be configured to capture and measure the first deviation along a y-axis perpendicular to the x-axis. Step 917 includes ending or concluding a run of the rotorcraft. Step 918 includes loosening upper jam nut and lower jam nut on the pitch link. Step 919 includes turning tube for a first adjustment to the pitch length. The turning of the tube in a first direction increases pitch length. The turning of the tube in a second direction, opposite the first direction, decreases pitch length. Step 920 includes counting track adjustment indicators entirely or partly passing the reference indicator as the tube is being turned for a measurement of the first adjustment to the pitch length. Step 921 includes tightening upper jam nut and lower jam nut (once the pitch length adjustment is made). Step 922 includes spooling up rotorcraft for an additional tracking run of the rotor blade. Step 923 includes identifying and measuring an additional deviation of the rotor blade from the rotation track. Step 924 includes concluding the additional run of the rotorcraft. Decision 925 includes determining whether the additional deviation by the rotor blade from the rotation track is greater than a predetermined tolerance. If the outcome is negative, the process proceeds to step 929 for an additional post-processing step that may include performing other adjustments to rotor blade or other components in main rotor assembly. If the outcome is "positive, then another iteration for tracking the rotor blade continues with step 926. Step 926 includes loosening the upper jam nut and the lower jam nut on the pitch link. Step 927 includes turning the tube to do an additional adjustment to the pitch length in one of the first direction or second direction, depending on whether the user desires to increase or decrease the pitch length (as described above with respect to step 919). Step 928 includes counting track adjustment indicators that at least partly pass the reference indicator. Then, steps 921-925 are repeated until an additional deviation is measured to be equal to zero or otherwise within the predetermined tolerance in decision 925. At that point, the pitch length is sufficiently adjusted. Then, step 929 includes the optional post-processing discussed above, and the tracking process for the rotor blade is concluded.

FIG. 10 representatively illustrates a method for tracking a plurality of rotor blades installed in a rotorcraft, that includes adjusting pitch length and tracking adjustments of the pitch length coupled to each of the rotor blades, at steps 940-959. Step 940 is an optional step of pre-processing that may include installing the rotor blades and/or pitch links, and making other adjustments in main rotor assembly to prepare for tracking the rotor blades. Step 941 includes coupling a pitch link to each of the rotor blades in the main rotor assembly. Step 942 includes tightening the upper jam nut and the lower jam nut on each pitch link. Step 943 includes marking, on each pitch link, the track adjustment indicator that is aligned with the reference indicator, as a starting point at which the pitch link is at its nominal or initial or unadjusted length. Step 944 includes beginning tracking the rotor blades. Step 945 includes spooling up the rotorcraft. Step 946 includes identifying and measuring deviations of each of the rotor blades from the rotation track. Step 947 includes ending or concluding a run of the rotor blades. Step 948 includes loosening the upper jam nut and lower jam nut on each of the pitch links coupled to the rotor blades that deviate from the rotation track by greater than a predetermined tolerance. Step 949 includes turning the tube of each of those pitch links to be adjusted. Step 950 includes counting track adjustment indicators at least partly passing the reference indicator for measuring pitch length adjustment on each pitch link being adjusted. Step 951 includes tightening upper jam nut and lower jam nut on the adjusted pitch links (once the pitch length adjustment is done). Step 952 includes spooling up rotorcraft for an additional tracking run of the rotor blades. Step 953 includes identifying and measuring additional deviations of each of the rotor blades from the rotation track. Step 954 includes concluding the additional run of the rotorcraft. Decision 955 includes determining whether any of the rotor blades deviate from the rotation track by an amount greater than the predetermined tolerance. If the outcome is negative, the process proceeds to step 959 for an additional post-processing step that may include performing other adjustments to the rotor blades or other components in main rotor assembly. If the outcome is positive, then Step 956 starts an additional iteration for tracking the rotor blade. Step 956 includes adjusting the pitch lengths of those pitch links coupled to those rotor blades deviating from the rotation track beyond the predetermined tolerance. Pitch lengths are adjusted as previously described. Step 957 includes keeping track of each pitch length adjustment by counting track adjustment indicators at least partly passing the reference indicator on each adjusted pitch link. Step 958 includes tightening the upper jam nuts and lower jam nuts on the adjusted pitch links. Then, steps 952-955 are repeated until none of the rotor blades deviate from the rotation track at all or deviate by an amount that is within the predetermined tolerance. At that point, the pitch length adjustments are completed, and a sufficiently optimal configuration is achieved. Then, step 959 includes the optional post-processing discussed above, and the tracking process for the rotor blades is concluded.

In a representative embodiment of a device, a rotor assembly comprises a pitch link configured to be coupled with a rotor blade and with a swash plate. The pitch link has a first end and a second end opposite the first end, and a vertical axis extending from the first end to the second end. The pitch link comprises a tube, an upper rod, and a lower rod. The tube has a first portion extending towards the first end of the pitch link, and a second portion opposite the first portion. The second portion of the tube extends towards the second end of the pitch link. The first rod comprises a first rod head, and a first rod body below the first rod head. The first rod body extends along the vertical axis below the first rod head. The first rod head is disposed at the first end of the pitch link. The first rod body is threaded into the tube at the first portion of the tube. The second head comprises a second rod head, and a second rod body above the second rod head. The second rod body extends along the vertical axis above the second rod head. The second rod head is disposed at the second end of the pitch link. The second rod body is threaded into the tube at the second portion of the tube. An outer vertically planar surface on the first rod head or the second rod head is marked with a reference indicator. The tube has an outer surface marked with a plurality of track adjustment indicators at the first portion of the tube along a circumference of the tube. The track adjustment indicators are vertical and substantially perpendicular to the circumference of the tube. The pitch link has a pitch length from the first end to the second end that is adjustable while the pitch link is coupled to the rotor blade and the swash plate. The pitch length is adjustable, in accordance with a vertical displacement of the tube relative to the first rod and the second rod. The adjustment to the pitch length is effected by turning the tube around the vertical axis in either a first direction or a second direction opposite the first direction. The turning of the tube in the first direction is configured to increase the pitch length. The turning of the tube in the second direction is configured to decrease the pitch length. A number of track adjustment indicators that entirely or at least partly pass the reference indicator, while the tube is being turned in one of the first direction and the second direction, is configured to indicate of an amount of adjustment to the pitch length. The first rod is an upper rod or a lower rod of the pitch link. When the first rod is the upper rod, the second rod is a lower rod, the first end of the pitch link is an upper end of the pitch link, the second end of the pitch link is a lower end of the pitch link, the first rod head is an upper rod head, the second rod head is a lower rod head, the first rod body is an upper rod body, the second rod body is a lower rod body, the first portion of the tube is an upper portion of the tube, and the second portion of the tube is a lower portion of the tube. When the first rod is the lower rod, the second rod is the upper rod, the first end of the pitch link is the lower end of the pitch link, the second end of the pitch link is the upper end of the pitch link, the first rod head is the lower rod head, the second rod head is the upper rod head, the first rod body is the lower rod body, the second rod body is the upper rod body, the first portion of the tube is the lower portion of the tube, and the second portion of the tube is the upper portion of the tube.

The track adjustment indicators may be shallow grooves on the outer surface of the tube, and have a same vertical length as one another. The shallow grooves may comprise twelve vertical grooves evenly spaced around an entirety of the circumference of the outer surface of the tube. The shallow grooves may comprise a plurality of short shallow grooves and a plurality of long shallow grooves. Each short shallow groove may be positioned between two adjacent long shallow grooves. The shallow grooves may begin at a top edge of the upper portion of the tube. The plurality of short shallow grooves may extend vertically downwards towards the lower portion of the tube for a first length. The plurality of the long shallow grooves may extend downwards towards the lower portion of the tube for a second length longer than the first length. The reference indicator may be a shallow vertical groove machined into the outer vertically planar surface of the upper rod head. A marking may be configured to be applied to a first track adjustment indicator that is substantially vertically aligned with the reference indicator prior to adjusting the pitch length. The marking may identify the first track adjustment indicator as a starting point providing an initial pitch length for the pitch link. The pitch length adjustment indications on the pitch link consist of the marking on the first track adjustment indicator, the track adjustment indicators on the upper portion of the tube, and the reference indicator on the upper rod head. The track adjustment may be vertical hash marks engraved in the outer surface of the tube, and the reference indicator may be a vertical hash mark engraved in the outer vertically planar surface of the upper rod head. The tube may further comprise a labeling on a middle of the tube between the upper portion and the lower portion. The labeling may indicate the first direction for the turning of the tube that increases the pitch length, and the second direction for the turning of the tube that decreases the pitch length. The pitch link may further comprise an upper jam nut around a neck of the upper rod body beneath the upper rod head, and a lower jam nut around a neck of the lower rod body above the lower rod head. The upper jam nut and the lower jam nut may be configured to be tightened relative to the tube to restrict the turning of the tube while the rotorcraft is in operation, and may be configured to be loosened relative to the tube to allow the turning of the tube for adjusting the pitch length. The tube may further comprise a tube body, and upper insert and a lower insert. The upper insert may be mounted inside the tube body in the upper portion of the tube. The lower insert may be mounted inside the tube body in the lower portion of the tube. The upper rod body may be threaded into the upper insert and the lower rod body is threaded into the lower insert. The lower rod body may have lower exterior threading of a first density. The upper rod body may have upper exterior threading of a second density different than the first density. The upper exterior threading and the lower exterior threading may both be right-handed.

In yet another representative embodiment, a rotorcraft includes a mast, a yoke, a plurality of rotor blades, a rotating ring, a plurality of pitch links, and a non-rotating ring. The mast is configured to rotate around a principal axis extending along a length of the mast. The yoke is coupled to the mast. A rotation of the yoke rotates the yoke around the principal axis. The plurality of rotor blades is coupled to the yoke around a circumference of the yoke. A rotation of the yoke rotates the plurality of rotor blades around the principal axis of the rotorcraft. The rotating ring is coupled to the mast or to the yoke. A rotation of the mast rotates the rotating ring around the principal axis, either directly, or via a rotation of the yoke. Each pitch link in the plurality of pitch links has a first end and a second end opposite the first end. The first end of the pitch link is coupled to one to one of the plurality of rotor blades. The second end is coupled to the rotating ring along a circumference of the rotating ring. Rotation of the rotating ring rotates the plurality of pitch links around the principal axis. The non-rotating ring is disposed under the rotating ring. The non-rotating ring changes a position or angle of the rotating ring relative to the principal axis while the rotating ring and the pitch links are in rotation around the principal axis. A change in the positioning of either or both sides of the rotating ring is configured to displace each of the plurality of pitch links relative to the principal axis and change pitch of the rotor blades, while the pitch links are engaged in maintaining the tip paths of the plurality of rotor blades within a tolerable distance from a rotation track. In the plurality of pitch links, each pitch link comprises a tube, a first rod and a second rod. The tube has an upper portion extending towards the first end of the pitch link and a second portion opposite the first portion that extends towards the second end of the pitch link. The first rod comprises a first rod head and a first rod body extending therefrom along a vertical axis defined between the first end and the second end of the pitch link. The first rod body is threaded into the tube at the first portion of the tube. The second rod comprises a second rod head and a second rod body extending therefrom along the vertical axis. The second rod body is threaded into the tube at the second portion of the tube. The first rod head has an outer vertically planar surface marked with a reference indicator. The tube has an outer surface marked with a plurality of track adjustment indicators at the first portion of the tube along a circumference of the tube. The track adjustment indicators are vertical and substantially perpendicular to the circumference of the tube. The pitch link has a pitch length from the first end to the second end that is adjustable from a nominal length. The pitch length is adjustable by vertically displacing the tube relative to the first rod and the second rod while the pitch link is coupled to the rotor blade and the rotating ring, by turning the tube relative to the first rod and the second rod in one of a first direction or a second direction around the vertical axis. The first direction increases the pitch length. The second direction decreases the pitch length. The amount of adjustment to the pitch length is configured to be determined in accordance with a number of track adjustment indicators in the plurality of track adjustment indicators that at least partly pass the reference indicator while the tube while the tube is turned in one of the first direction or the second direction. The first rod is an upper rod or a lower rod of the pitch link. When the first rod is the upper rod, the second rod is a lower rod, the first end of the pitch link is an upper end of the pitch link, the second end of the pitch link is a lower end of the pitch link, the first rod head is an upper rod head, the second rod head is a lower rod head, the first rod body is an upper rod body, the second rod body is a lower rod body, the first portion of the tube is an upper portion of the tube, and the second portion of the tube is a lower portion of the tube. When the first rod is the lower rod, the second rod is the upper rod, the first end of the pitch link is the lower end of the pitch link, the second end of the pitch link is the upper end of the pitch link, the first rod head is the lower rod head, the second rod head is the upper rod head, the first rod body is the lower rod body, the second rod body is the upper rod body, the first portion of the tube is the lower portion of the tube, and the second portion of the tube is the upper portion of the tube.

The rotorcraft may further comprise a plurality of pitch horns, a plurality of grips, and three drive actuators. Each pitch horn may couple a respective one of the plurality of pitch links to a respective one of the plurality of rotor blades. Each grip may attach a respective one of the plurality of pitch horns to the respective one of the plurality of rotor blades and couple the respective one of the plurality of rotor blades to the yoke. The three drive actuators may be coupled to the non-rotating ring. The drive actuators may be configured for changing the position or angle of the non-rotating ring relative to the principal axis.

In another representative embodiment, a method comprises a step of installing a first rotor blade in a rotor assembly of a rotorcraft. The first rotor blade is one of a plurality of rotor blades installed in the rotor assembly. A first operation of the rotor assembly is started with a first spooling up of the rotor assembly while the rotorcraft remains grounded. A first deviation is measured of a tip path of the first rotor blade from a rotation track. The first operation of the rotor assembly is stopped. Based on the first deviation, a first adjustment is made to a pitch length of a first pitch link that is coupled to the first rotor blade. The first pitch link has an upper end, a lower end opposite the upper end, and a vertical axis defined from the upper end to the lower end. The first pitch link comprises a tube between the upper end and the lower end, an upper rod at the upper end threaded into an upper portion of the tube, and a lower rod at the lower end threaded into a lower portion of the tube. The upper rod couples the first pitch link to the first rotor blade. The lower rod couples the first pitch link to a swash plate of the rotor assembly. In order to make the first adjustment to the pitch length, an upper jam nut on the upper end of the pitch link is loosened and a lower jam nut of the lower end of the pitch link is loosened. Then, the tube is turned around the vertical axis while the first pitch link remains coupled in position to the first rotor blade and the swash plate. The tube turning a first direction increases the pitch length. The tube turning in a second direction, opposite the first direction, decreases the pitch length. The amount of the first adjustment to the pitch length is determined by counting a first number of vertical track adjustment indicators on the tube that at least partly pass a vertical reference indicator on the upper rod or the lower rod, while the tube is turned in one of the first direction or the second direction. A plurality of vertical track adjustment indicators, including the first number of vertical track adjustment indicators, are machined onto an outer surface of the upper portion or the lower portion of the tube. The vertical reference indicator is machined onto a substantially vertical and substantially planar surface of the upper rod or the lower rod. The upper jam nut and the lower jam nut are tightened. A second operation of the rotor assembly is started after making the first adjustment. Based on the second operation, determining whether the first adjustment to the pitch length reduced a second deviation of the first rotor blade from the rotation track.

The method may further comprise a step based on the second deviation, of making a second adjustment to the pitch length of the first pitch link. An amount of the second adjustment to the pitch length may be determined by counting a second number of vertical track adjustment indicators on the tube that at least partly pass the vertical reference indicator on the upper rod or the lower rod, while the tube is turned in one of the first direction or the second direction. The method may further comprise the step of engaging in a subsequent operation of the rotor assembly. During the subsequent operation, a subsequent deviation may be measured of the first rotor blade from the rotation track. Based on the subsequent deviation, an additional adjustment may be made to the pitch length of the first pitch link. An amount of the additional adjustment to the pitch length may be determined by counting a third number of vertical track adjustment indicators on the tube that at least partly pass the vertical reference indicator on the upper rod while the tube is turned in one of the first direction or the second direction. Until a subsequent deviation of the first rotor blade from the rotation track is measured to be within a predetermined tolerance, the method may further comprise repeatedly: engaging the subsequent operation of the rotor assembly, measuring the subsequent deviation, making the additional adjustment to the pitch length of the first pitch link based on the subsequent deviation, and determining the amount of the additional adjustment. Prior to starting the first operation of the rotor assembly, a first vertical track adjustment indicator substantially aligned with the vertical reference indicator may be identified, and marked as a starting point for pitch length adjustment. Marking the first vertical track adjustment indicator may be indicative of a position of the tube corresponding to an unadjusted length of the first pitch link. A total adjustment to the pitch length for the first pitch link from the unadjusted length may be measured by determining how many track adjustment indicators at least partly pass the vertical reference indicator over a course of making the first adjustment, the second adjustment, and each subsequent adjustment.

As used herein, the terms "comprises," "comprising," "includes," "including," "has," "having," or any contextual variant thereof, are intended to reference a non-exclusive inclusion. For example, a process, product, article, or apparatus that comprises a list of elements is not necessarily limited to only those elements, but may include other elements not expressly listed or inherent to such process, product, article, or apparatus. Furthermore, unless expressly stated to the contrary, "or" refers to an inclusive or and not an exclusive or. That is, the term "or" as used herein is generally intended to mean "and/or" unless otherwise indicated. For example, a condition "A or B" is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural connotations for such term, unless the context clearly indicates otherwise.

Further, spatially relative terms, such as "beneath," "below," "lower," "above," "upper," and the like, may be used herein for ease of description to describe one element's or feature's relationship to another element or feature as representatively illustrated in the figures. Spatially relative terms are intended to encompass different orientations of the device in use or operation, in addition to the orientation depicted in the figures. The apparatus may otherwise be oriented (rotated 90 degrees or at other orientations) and spatially relative descriptors used herein may likewise be interpreted accordingly.

Additionally, although steps or operations described herein may be presented in a specific order, this order may be changed in different embodiments. In some embodiments, to the extent multiple steps are shown as sequential in the preceding description, some combination of such steps in alternative embodiments may be performed at a same time. The sequence of operations described herein may be interrupted, suspended, or otherwise controlled by another process or system.

Examples or illustrations provided herein are not to be regarded in any way as restrictions on, limits to, or express definitions of any term or terms with which they are associated. Instead, these examples or illustrations are to be regarded as being described with respect to a particular embodiment and as merely illustrative. Those skilled in the art will appreciate that any term or terms with which these examples or illustrations are associated will encompass other embodiments that may or may not be given therewith or elsewhere in the specification, and all such embodiments are intended to be included within the scope of that term or terms. Language designating such non-limiting examples and illustrations includes, but is not limited to: "for example," "for instance," "e.g.," "etc.," "or the like," "in a representative embodiment," "in one embodiment," "in another embodiment," or "in some embodiments." Reference throughout this specification to "one embodiment," "an embodiment," "a representative embodiment," "a particular embodiment," or "a specific embodiment," or contextually similar terminology, means that a particular feature, structure, property, or characteristic described in connection with the described embodiment is included in at least one embodiment, but may not necessarily be present in all embodiments. Thus, respective appearances of the phrases "in one embodiment," "in an embodiment," or "in a specific embodiment," or similar terminology in various places throughout the description are not necessarily referring to the same embodiment. Furthermore, particular features, structures, properties, or characteristics of any specific embodiment may be combined in any suitable manner with one or more other embodiments.

The scope of the present disclosure is not intended to be limited to the particular embodiments of any process, product, machine, article of manufacture, assembly, apparatus, means, methods, or steps herein described. As one skilled in the art will appreciate, various processes, products, machines, articles of manufacture, assemblies, apparatuses, means, methods, or steps, whether presently existing or later developed, that perform substantially the same function or achieve substantially similar results in correspondence to embodiments described herein, may be utilized according to their description herein. The appended claims are intended to include within their scope such processes, products, machines, articles of manufacture, assemblies, apparatuses, means, methods, or steps.

Benefits, other advantages, and solutions to problems have been described herein with regard to representative embodiments. However, any benefits, advantages, solutions to problems, or any component thereof that may cause any benefit, advantage, or solution to occur or to become more pronounced are not to be construed as critical, required, or essential features or components.

What is claimed is:

1. A system comprising:
   a rotor assembly comprising:
      a pitch link configured to be coupled with a rotor blade and with a swash plate, the pitch link having an first end and a second end opposite the first end and a vertical axis extending from the first end to the second end;
   wherein the pitch link comprises:
      a tube having a first portion extending towards the first end of the pitch link, and a second portion opposite the first portion, the second portion extending towards the second end of the pitch link;
      a first rod comprising a first rod head and a first rod body extending therefrom along the vertical axis, the first rod head being disposed at the first end of the pitch link, the first rod head configured to couple the pitch link to the rotor blade, and the first rod body threaded into the tube at the first portion of the tube; and
      a second rod comprising a second rod head and a second rod body extending therefrom along the vertical axis, the second rod head being disposed at the second end of the pitch link, the second rod head configured to couple the pitch link to the swash plate, and the second rod body threaded into the tube at the second portion of the tube;
   wherein:
      the first rod head has an outer vertically planar surface marked with a reference indicator, and the tube has an outer surface marked with a plurality of track adjustment indicators at the first portion of the tube along a circumference of the tube, the track adjustment indicators being vertical and substantially perpendicular to the circumference;
      the pitch link has a pitch length from the first end to the second end that is adjustable while the pitch link is coupled to the rotor blade and the swash plate, in accordance with a vertical displacement of the tube relative to the first rod and the second rod effected by a turning the tube in a first direction and a second direction around the vertical axis, the first direction configured to increase the pitch length, and the second direction opposite the first direction configured to decrease the pitch length;
      a number of track adjustment indicators entirely or partly passing the reference indicator while the tube is being turned in one of the first direction and the second direction is configured to indicate of an amount of adjustment to the pitch length; and
      the first rod is an upper rod or a lower rod of the pitch link, wherein:
         when the first rod is the upper rod, the second rod is a lower rod, the first end of the pitch link is an upper end of the pitch link, the second end of the pitch link is a lower end of the pitch link, the first rod head is an upper rod head, the second rod head is a lower rod head, the first rod body is an upper rod body, the second rod body is a lower rod body, the first portion of the tube is an upper portion of the tube, and the second portion of the tube is a lower portion of the tube; and
         when the first rod is the lower rod, the second rod is the upper rod, the first end of the pitch link is the lower end of the pitch link, the second end of the pitch link is the upper end of the pitch link, the first rod head is the lower rod head, the second rod head is the upper rod head, the first rod body is the lower rod body, the second rod body is the upper rod body, the first portion of the tube is the lower portion of the tube, and the second portion of the tube is the upper portion of the tube.

2. The system of claim 1, wherein the track adjustment indicators are shallow grooves on the outer surface of the tube.

3. The system of claim 2, wherein the shallow grooves have a same vertical length as one another.

4. The system of claim 2, wherein the shallow grooves comprise twelve vertical grooves evenly spaced around an entirety of the circumference of the outer surface of the tube.

5. The system of claim 4, wherein:
   the shallow grooves include a plurality of short shallow grooves and a plurality of long shallow grooves;
   each short shallow groove is positioned between two adjacent long shallow grooves; and
   the shallow grooves begin at a top edge of the upper portion of the tube, the plurality of short shallow grooves extending vertically downwards towards the lower portion of the tube for a first length, and the plurality of the long shallow grooves extend downwards towards the lower portion of the tube for a second length longer than the first length.

6. The system of claim 1, wherein the reference indicator is a shallow vertical groove machined into the outer vertically planar surface of the upper rod head.

7. The system of claim 1, wherein a marking is configured to be applied to a first track adjustment indicator that is vertically aligned with the reference indicator prior to adjusting the pitch length, wherein the marking identifies the first track adjustment indicator as a starting point providing an initial pitch length for the pitch link.

8. The system of claim 7, wherein pitch length adjustment indications on the pitch link consist of the marking on the first track adjustment indicator, the track adjustment indicators on the upper portion of the tube, and the reference indicator on the upper rod head.

9. The system of claim 1, wherein the track adjustment indicators are vertical hash marks engraved in the outer surface of the tube, and the reference indicator is a vertical hash mark engraved in the outer vertically planar surface of the upper rod head.

10. The system of claim 1, wherein the first direction is a counter-clockwise direction, the second direction is a clockwise direction, and the tube further comprises:
a labeling on a middle of the tube between the upper portion and the lower portion, the labeling indicating the counter-clockwise direction for the turning of the tube that increases the pitch length, and indicating the clockwise direction for the turning of the tube that decreases the pitch length.

11. The system of claim 1, wherein the pitch link further comprises:
an upper jam nut around a neck of the upper rod body beneath the upper rod head; and
a lower jam nut around a neck of the lower rod body above the lower rod head, wherein the upper jam nut and the lower jam nut are configured to be tightened relative to the tube to restrict the turning of the tube while being engaged in an operation of a rotorcraft, and are configured to be loosened relative to the tube to allow the turning of the tube for adjusting the pitch length.

12. The system of claim 1, wherein the tube comprises:
a tube body;
an upper insert mounted inside the tube body in the upper portion of the tube; and
a lower insert mounted inside the tube body in the lower portion of the tube;
wherein the upper rod body is threaded into the upper insert and the lower rod body is threaded into the lower insert;
wherein the lower rod body has lower exterior threading of a first density;
wherein the upper rod body has upper exterior threading of a second density different than the first density; and
wherein the upper exterior threading and the lower exterior threading are both right-handed.

13. A rotorcraft comprising:
a mast configured to rotate around a principal axis, wherein the principal axis extends along a length of the mast;
a yoke coupled to the mast, wherein a rotation of the mast rotates the yoke around the principal axis;
a plurality of rotor blades coupled to the yoke around a circumference of the yoke, wherein a rotation of the yoke rotates the plurality of rotor blades around the principal axis, and wherein a tip of each of the plurality of rotor blades traces a tip path while the rotor blade is rotating around the principal axis;
a rotating ring coupled to the mast or to the yoke, wherein a rotation of the mast rotates the rotating ring around the principal axis, either directly, or via a rotation of the yoke;
a plurality of pitch links, wherein each pitch link has a first end and a second end opposite the first end, the first end coupled to one of the plurality of rotor blades, and the second end coupled to the rotating ring along a circumference of the rotating ring, with a rotation of the rotating ring rotating the plurality of pitch links around the principal axis; and
a non-rotating ring disposed under the rotating ring, wherein the non-rotating ring changes a position or angle of the rotating ring relative to the principal axis while the rotating ring and the pitch links are in rotation around the principal axis;
wherein a change in the positioning of either or both sides of the rotating ring is configured to displace each of the plurality of pitch links relative to the principal axis and change pitch of the rotor blades, while the pitch links are engaged in maintaining the tip paths of the plurality of rotor blades within a tolerable distance from a rotation track;
wherein, for each pitch link in the plurality of pitch links, the pitch link comprises:
a tube having a first portion extending towards the first end of the pitch link, and a second portion opposite the first portion, wherein the second portion extends towards the second end of the pitch link;
a first rod comprising a first rod head and a first rod body extending therefrom along a vertical axis defined between the first end and the second end of the pitch link, wherein the first rod head is configured to couple the pitch link to the rotor blade, and the first rod body is threaded into the tube at the first portion of the tube; and
a second rod comprising a second rod head and a second rod body extending therefrom along the vertical axis, wherein the second rod head is configured to couple the pitch link to the swash plate, and the second rod body is threaded into the tube at the second portion of the tube; and
wherein, for each pitch link in the plurality of pitch links:
the first rod head has an outer vertically planar surface marked with a reference indicator, and the tube has an outer surface marked with a plurality of track adjustment indicators at the first portion of the tube along a circumference of the tube, the track adjustment indicators being vertical and substantially perpendicular to the circumference;
the pitch link has a pitch length from the first end to the second end that is adjustable from a nominal length; and
the pitch length is adjustable by vertically displacing the tube relative to the first rod and the second rod while the pitch link is coupled to the rotor blade and the rotating ring by turning the tube relative to the first rod and the second rod in one of a first direction or a second direction around the vertical axis, the first direction increasing the pitch length, and the second direction decreasing the pitch length;
wherein an amount of adjustment to the pitch length is configured to be determined in accordance with a number of track adjustment indicators in the plurality of track adjustment indicators that at least partly pass the reference indicator while the tube is turned in one of the first direction or the second direction; and wherein the first rod is an upper rod or a lower rod of the pitch link, wherein:

when the first rod is the upper rod, the second rod is a lower rod, the first end of the pitch link is an upper end of the pitch link, the second end of the pitch link is a lower end of the pitch link, the first rod head is an upper rod head, the second rod head is a lower rod head, the first rod body is an upper rod body, the second rod body is a lower rod body, the first portion of the tube is an upper portion of the tube, and the second portion of the tube is a lower portion of the tube; and when the first rod is the lower rod, the second rod is the upper rod, the first end of the pitch link is the lower end of the pitch link, the second end of the pitch link is the upper end of the pitch link, the first rod head is the lower rod head, the second rod head is the upper rod head, the first rod body is the lower rod body, the second rod body is the upper rod body, the first portion of the tube is the lower portion of the tube, and the second portion of the tube is the upper portion of the tube.

14. The rotorcraft of claim 13, further comprising:
a plurality of pitch horns, each pitch horn coupling a respective one of the plurality of pitch links to a respective one of the plurality of rotor blades;
a plurality of grips, each grip attaching a respective one of the plurality of pitch horns to the respective one of the plurality of rotor blades and coupling the respective one of the plurality of rotor blades to the yoke; and
three drive actuators, the three drive actuators coupled to the non-rotating ring, the three drive actuators configured for changing a position or angle of the non-rotating ring relative to the principal axis.

15. A method comprising:
installing a first rotor blade in a rotor assembly of a rotorcraft, wherein the first rotor blade is one of a plurality of rotor blades installed in the rotor assembly;
starting a first operation of the rotor assembly with a first spooling up the rotor assembly while the rotorcraft remains grounded;
measuring a first deviation of a tip path of the first rotor blade from a rotation track;
stopping the first operation of the rotor assembly;
based on the first deviation, making a first adjustment to a pitch length of a first pitch link that is coupled to the first rotor blade, wherein:
the first pitch link has an upper end, a lower end opposite the upper end, and a vertical axis defined from the upper end to the lower end;
the first pitch link comprises:
a tube between the upper end and the lower end;
an upper rod at the upper end threaded into an upper portion of the tube, the upper rod coupling the first pitch link to the first rotor blade; and
a lower rod at the lower end threaded into a lower portion of the tube, the lower rod coupling the first pitch link to a swash plate of the rotor assembly,
wherein making the first adjustment comprises:
loosening an upper jam nut on the upper end of the first pitch link, and loosening a lower jam nut on the lower end of the first pitch link; and
turning the tube around the vertical axis while the first pitch link remains coupled in position to the first rotor blade and the swash plate, the tube turning in a first direction for increasing the pitch length, or in a second direction opposite the first direction for decreasing the pitch length;
determining an amount of the first adjustment to the pitch length by counting a first number of vertical track adjustment indicators on the tube that at least partly pass a vertical reference indicator on the upper rod or the lower rod, while the tube is turned in one of the first direction or the second direction, wherein a plurality of vertical track adjustment indicators, including the first number of vertical track adjustment indicators, are machined onto an outer surface of the upper portion or the lower portion of the tube, and the vertical reference indicator is machined onto a substantially vertical and substantially planar surface of the upper rod or the lower rod; and
tightening the upper jam nut and tightening the lower jam nut;
after making the first adjustment, starting a second operation of the rotor assembly; and
based on the second operation, determining whether the first adjustment to the pitch length reduced a second deviation of the first rotor blade from the rotation track.

16. The method of claim 15, further comprising:
based on the second deviation, making a second adjustment to the pitch length of the first pitch link; and
determining an amount of the second adjustment to the pitch length by counting a second number of vertical track adjustment indicators on the tube that at least partly pass the vertical reference indicator on the upper rod or the lower rod, while the tube is turned in one of the first direction or the second direction.

17. The method of claim 16, further comprising:
engaging in a subsequent operation of the rotor assembly;
during the subsequent operation, measuring a subsequent deviation of the first rotor blade from the rotation track;
based on the subsequent deviation, making an additional adjustment to the pitch length of the first pitch link; and
determining an amount of the additional adjustment to the pitch length of the first pitch link by counting a third number of vertical track adjustment indicators on the tube that at least partly pass the vertical reference indicator on the upper rod or the lower rod, while the tube is turned in one of the first direction or the second direction.

18. The method of claim 17, wherein, until the subsequent deviation of the first rotor blade from the rotation track is measured to be within a predetermined tolerance, repeating steps of:
engaging the subsequent operation of the rotor assembly;
measuring the subsequent deviation;
based on the subsequent deviation, making the additional adjustment to the pitch length of the first pitch link; and
determining the amount of the additional adjustment.

19. The method of claim 18, further comprising:
prior to starting the first operation of the rotor assembly:
identifying a first vertical track adjustment indicator substantially aligned with the vertical reference indicator; and
marking the first vertical track adjustment indicator as a starting point for pitch length adjustment,
wherein marking the first vertical track adjustment indicator is indicative of a position of the tube corresponding to an unadjusted length of the first pitch link.

20. The method of claim 19, further comprising:
measuring a total adjustment to the pitch length for the first pitch link from the unadjusted length by determining how many track adjustment indicators at least partly pass the vertical reference indicator over a course of making the first adjustment, the second adjustment, and each subsequent adjustment.

* * * * *